United States Patent
Isozaki et al.

(10) Patent No.: US 7,227,672 B2
(45) Date of Patent: Jun. 5, 2007

(54) GEAR CHANGING DEVICE AND COMMUNICATION APPARATUS INCLUDING THE SAME

(75) Inventors: Atsushi Isozaki, Ichinomiya (JP); Hideki Yamamoto, Nagoya (JP); Akihiro Ikeda, Ohbu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1025 days.

(21) Appl. No.: 10/084,415

(22) Filed: Feb. 28, 2002

(65) Prior Publication Data
US 2002/0118395 A1 Aug. 29, 2002

(30) Foreign Application Priority Data
Feb. 28, 2001 (JP) ............................ 2001-055258

(51) Int. Cl.
*H04N 1/36* (2006.01)
(52) U.S. Cl. ...................................... 358/414; 358/423
(58) Field of Classification Search ............... 358/400, 358/401, 1.3, 406, 414, 423; 74/665 G
See application file for complete search history.

(56) References Cited

U.S. PATENT DOCUMENTS

| | | | | |
|---|---|---|---|---|
| 3,893,703 | A | * 7/1975 | Chika | ......................... 280/753 |
| 3,980,937 | A | * 9/1976 | Bostrom et al. | ............ 318/466 |
| 5,226,639 | A | 7/1993 | Kida et al. | |
| 5,697,263 | A | * 12/1997 | Funahashi et al. | ........ 74/665 G |
| 5,764,372 | A | 6/1998 | Kondo | |
| 6,170,619 | B1 | * 1/2001 | Sheriff et al. | ................ 188/107 |
| 6,178,863 | B1 | 1/2001 | Kobayashi et al. | |
| 6,519,418 | B2 | * 2/2003 | Nakagawa | .................... 396/62 |
| 2001/0037794 | A1 | * 11/2001 | Wayama et al. | ............ 123/399 |
| 2002/0154916 | A1 | * 10/2002 | Stirling et al. | ................ 399/27 |
| 2003/0107272 | A1 | * 6/2003 | Westerweck et al. | ....... 307/119 |

FOREIGN PATENT DOCUMENTS

| | | |
|---|---|---|
| JP | A 6-167741 | 6/1994 |
| JP | A 6-347877 | 12/1994 |
| JP | A 6-347878 | 12/1994 |
| WO | WO00/62288 | * 10/2000 |

* cited by examiner

*Primary Examiner*—Jerome Grant, II
(74) *Attorney, Agent, or Firm*—Oliff & Berridge, PLC

(57) ABSTRACT

In a gear changing device, when a sun gear rotates in a forward direction, a rotating member is rotated in the same direction as the sun gear and planetary gears are pivotally rotated around the sun gear. When the sun gear rotates in a reverse direction, the rotating member stops rotating and allows the planetary gears to rotate on axes thereof to a plurality of predetermined positions on a path of the planetary gear that pivotally rotates. A plurality of transmission gears are provided at a plurality of predetermined positions along the path of the planetary gear pivotally rotating, so as to engage with each of the planetary gears. A plurality of recesses and projections that are recessed and protruded, respectively, in the diametrical direction of the rotating member are alternately formed in an outer periphery of the rotating member. Each of the recesses and projections has a specific width. A sensor switch that detects the recesses and the projections at a predetermined position is provided. By the gear changing device, rotating directions of the sun gear can be switched at an appropriate timing and operation modes can be smoothly changed.

19 Claims, 19 Drawing Sheets

FIG.18

| ROW \ COLUMN | →READING | →STANDBY | →FEEDING | →RECORDING | →COPYING | →DISCHARGING |
|---|---|---|---|---|---|---|
| →READING | | TO ON, REVERSE AMOUNT = 20 | NEXT ON = 1, REVERSE AMOUNT = 50 | HP, REVERSE AMOUNT = 167 | HP, NEXT ON = 1, REVERSE AMOUNT = 0 | HP, NEXT ON = 2, REVERSE AMOUNT = 0 |
| →STANDBY | TO ON, REVERSE AMOUNT = 20 | | NEXT ON = 1, REVERSE AMOUNT = 50 | HP, REVERSE AMOUNT = 167 | HP, NEXT ON = 1, REVERSE AMOUNT = 0 | HP, NEXT ON = 2, REVERSE AMOUNT = 0 |
| →FEEDING | HP, NEXT ON = 3, REVERSE AMOUNT = 20 | HP, NEXT ON = 3, REVERSE AMOUNT = 20 | | HP, REVERSE AMOUNT = 167 | HP, NEXT ON = 1, REVERSE AMOUNT = 0 | HP, NEXT ON = 2, REVERSE AMOUNT = 0 |
| →RECORDING | NEXT ON = 3, REVERSE AMOUNT = 20 | NEXT ON = 3, REVERSE AMOUNT = 20 | NEXT ON = 4, REVERSE AMOUNT = 50 | | NEXT ON = 1, REVERSE AMOUNT = 13 | NEXT ON = 2, REVERSE AMOUNT = 0 |
| →COPYING | NEXT ON = 2, REVERSE AMOUNT = 20 | NEXT ON = 2, REVERSE AMOUNT = 20 | NEXT ON = 3, REVERSE AMOUNT = 50 | HP, REVERSE AMOUNT = 167 | | NEXT ON = 1, REVERSE AMOUNT = 0 |
| →DISCHARGING | NEXT ON = 1, REVERSE AMOUNT = 20 | NEXT ON = 1, REVERSE AMOUNT = 20 | NEXT ON = 2, REVERSE AMOUNT = 50 | HP, REVERSE AMOUNT = 167 | HP, NEXT ON = 1, REVERSE AMOUNT = 0 | |

GEAR CHANGING DEVICE AND COMMUNICATION APPARATUS INCLUDING THE SAME

BACKGROUND OF THE INVENTION

1. Field of Invention

This invention relates to a gear changing device, for use in a communication apparatus, such as a facsimile machine, that changes gears according to the switching of modes, for instance, between an image reading mode, recording mode, and copying mode. This invention also relates to a communication apparatus including the gear changing device.

2. Description of Related Art

In an operation mode of a facsimile machine, such as an image reading a mode, a recording mode, and a copying mode, only relevant gears for the operation modes need to be rotated. To achieve this, a gear changing device is devised that changes gears according to the switching of the operation modes. Such gear changing devices are disclosed in U.S. Pat. Nos. 5,764,372 and 6,178,863 B1. The gear changing device disclosed in U.S. Pat. No. 5,764,372 includes a control motor, two sun gears, two planetary gears, and a switching cam. The gear changing device disclosed in U.S. Pat. No. 6,178,863 B1 includes a control motor, a sun gear, two planetary gears, and a solenoid. As the sun gear rotates in the forward or reverse direction, the planetary gears are pivotally moved clockwise or counterclockwise, selectively engaging with transmission gears. Accordingly, the drive force of the sun gear is transmitted to a plurality of transmission paths. Because the pivotal movement of the planetary gears may or may not be prevented depending on the phases of the switching cam or by turning the solenoid on or off, the planetary gears are selectively engaged with the transmission gears in each of the operational modes. Thus, the drive force of the sun gear is selectively transmitted to the transmission paths.

Such known gear changing devices require a large number of parts other than the sun gear and the planetary gear, leading to complicated structures, as well as making the gear changing device larger in size. Consequently, a communication apparatus including the gear changing device naturally becomes larger in size, so that the reduction of the physical size of the communication apparatus is difficult to achieve.

SUMMARY OF THE INVENTION

Accordingly, one aspect of the invention is to provide a gear changing device that has a simple structure and is smaller in size and also to provide a communication apparatus including such a gear changing device. Another aspect of the invention is to provide a gear changing device that switches rotating directions of a sun gear at an appropriate time and also switches operation modes smoothly, as well as to provide a communication apparatus that includes such a gear changing device.

To achieve the above-described aspects, in a gear changing device of this invention, a drive motor is rotatable in a forward direction or a reverse direction. A sun gear is rotated by the drive motor. A planetary gear is constantly engaged with the sun gear. A rotating member is concentric with the sun gear and rotates in a same direction as the sun gear when the sun gear rotates in the forward direction, so as to pivotally rotate the planetary gear around the sun gear. The rotating member stops rotating when the sun gear rotates in the reverse direction, so as to allow the planetary gear to rotate on an axis of the planetary gear at a plurality of predetermined positions on a path of the planetary gear where the planetary gear pivotally rotates. The rotating member is provided on a circumference thereof with a plurality of recesses and projections that are dented or protruded in a diametrical direction of the rotating member. The rotating member alternately disposes the recesses and projections, each of which have a specific width. A plurality of transmission gears are engaged with the planetary gear at the predetermined positions on the path of the planetary gear where the planetary gear pivotally rotates. A sensor switch detects the recesses and the projections at a fixed position.

In the above-described gear changing device, a timing at which the sun gear is rotated in the reverse direction, or the forward direction may be controlled based on the widths of the recesses and the projections formed on the circumference of the rotating member. In this way the rotating directions of the sun gear may be changed at an appropriate timing. The planetary gear may be securely engaged with the transmission gears required for operation modes and the operation mode may be switched smoothly.

BRIEF DESCRIPTION OF THE DRAWINGS

Various exemplary embodiments of the invention will be described with reference to the accompanying drawings in which like elements are labeled with like numbers and in which:

FIG. 14 is a flowchart showing ON-detection processes to detect when a sensor switch is turned on;

FIG. 18 is an explanatory view showing a table to be referred to when an operation is switched to another operation;

DETAILED DESCRIPTION OF PREFERRED EMBODIMENTS

Figure 1:
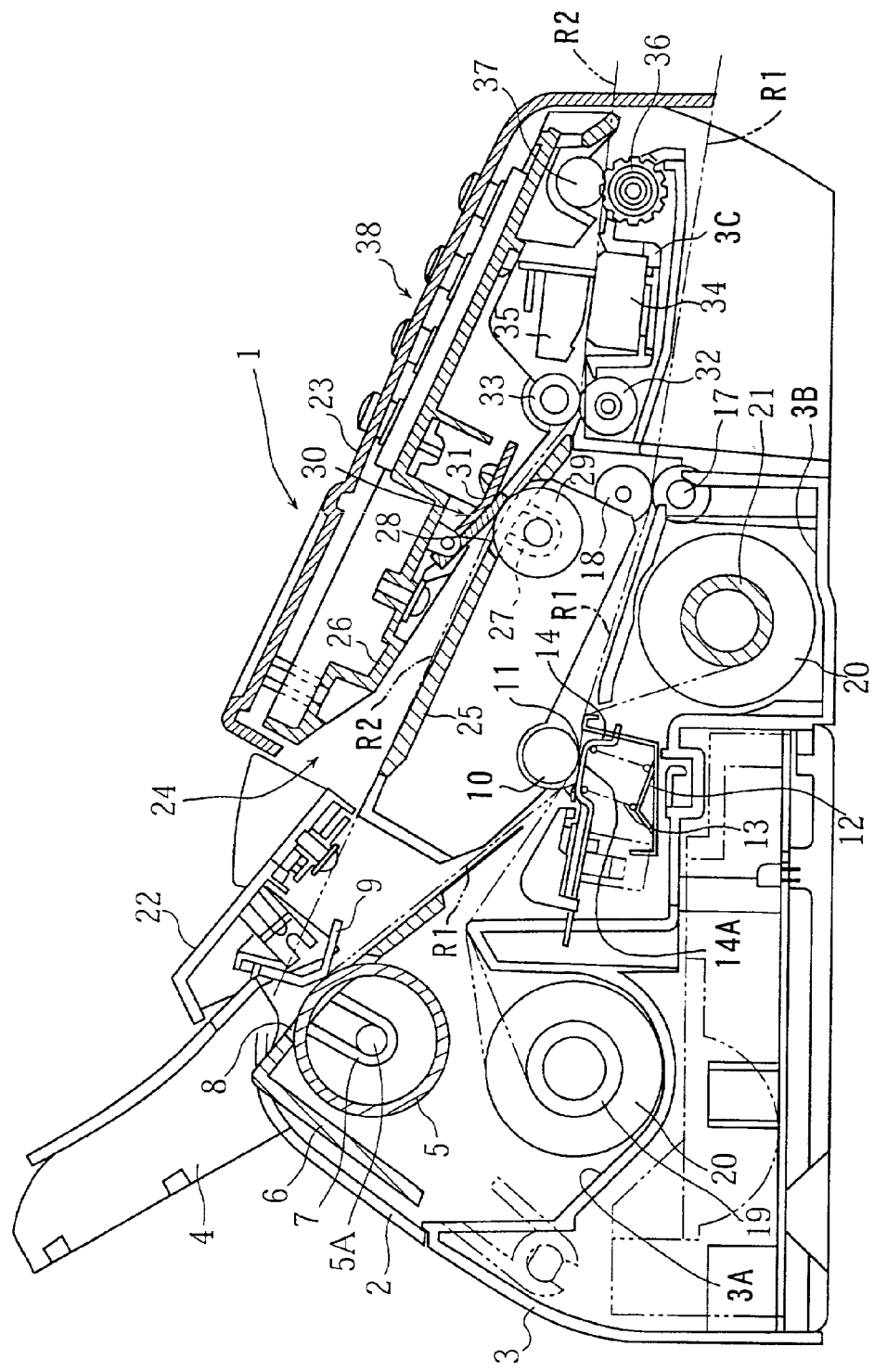
FIG. 1 is a side sectional view of a facsimile machine including a gear changing device according to an exemplary embodiment of the invention.

FIG. 1 is a side sectional view of a facsimile machine including a gear changing device according to an exemplary embodiment.

As shown in FIG. 1, a facsimile machine 1 includes an upper cover 2 and a lower cover 3. Provided at an upper portion of the upper cover 2 (upper left portion in FIG. 1) is a sheet stacker 4 on which recording sheets are stacked. A sheet pick-up roller 5 is disposed adjacent to the sheet stacker 4. The sheet pick-up roller 5 is driven by a drive motor 57 (shown in FIG. 3) and rotated through gears, which will be described in more detail below.

The sheet pick-up roller 5 is rotatably supported by a roller shaft 5A in a roller supporting portion 7 of a support plate 6. The pick-up roller 5 is partially exposed above the support plate 6 through a roller opening 8 formed in the support plate 6. A regulating member 9 that separates the recording sheets stacked on the sheet stacker 4 one by one, is disposed opposite to the sheet pick-up roller 5, so as to elastically press against a surface of the sheet pick-up roller 5. The sheet pick-up roller 5 and the regulating member 9 cooperate to feed the recording sheets one by one, along a sheet feeding path R1.

A platen roller 10 is disposed at a substantially central portion of the sheet feeding path R1. The platen roller 10 is driven by the drive motor 57 and rotated through gears, which will be described in more detail. A thermal head 11 is disposed so as to face the platen roller 10. The thermal head 11 is a line thermal head including heating elements which are arranged in an array. The thermal head 11 has a length approximately as the same as the width of the recording sheet and the heating elements are provided in line so as to correspond to a printable width on the recording sheet. Thus, the thermal head 11 covers a printable area on the recording sheet. The thermal head 11 is secured on an upper surface of a head holding portion 14.

The head holding portion 14 is urged upwardly by an urging spring 13 provided between a spring holding member 12 and a recess 14A provided on a side opposite to the platen roller 10. The thermal head 11 is pressed against the platen roller 10 with an urging force of the urging spring 13. The thermal head 11 is released from the platen roller 10 according to operation modes of the facsimile machine 1. A mechanism for releasing the thermal head 11 is irrelevant to this invention, so that the mechanism is not described or illustrated herein.

A sheet discharge roller 17 is disposed downstream of the platen roller 10 in the sheet feeding path R1. A pinch roller 18 is disposed above the sheet discharge roller 17, so as to press against the sheet discharge roller 17. The sheet discharge roller 17 is driven by the drive motor 57 and rotated through gears, which will be described in more detail. The sheet discharge roller 17 feeds the recording sheet downstream in the sheet feeding path R1, in cooperation with the pinch roller 18, to discharge the recording sheet from the facsimile machine 1 after recording is performed.

A ribbon accommodating portion 3A is formed in the lower cover 3 below the sheet pick-up roller 5. The ribbon accommodating portion 3A accommodates a roll of ribbon 20 wound around a cylinder 19. The ribbon 20 has enough width to cover the area printable with the heating elements of the line thermal head 11. The ribbon 20 is taken from the ribbon accommodating portion 3A, passing between the platen roller 10 and the thermal head 11. Then, the ribbon 20 is taken up by a ribbon take-up spool 21 provided in a ribbon take-up portion 3B. The ribbon take-up spool 21 is driven by the drive motor 57 and rotated through gears, as described below, to take up the ribbon 20 used for recording.

A document feed mechanism will be described. A document tray 22 is formed on the upper cover 2 to the upper right side of the sheet stacker 4 in FIG. 1 (above the regulating member 9). A document insertion opening 24 is provided between the document tray 22 and an upper panel plate 23. A document supporting portion 25 is provided to the right downward side of the document tray 22 along a document feeding path R2 in FIG. 1. A document guiding portion 26 curved downwardly is provided above the document supporting portion 25 so as to face the portion 25. The document supporting portion 25 and the document guiding portion 26 form the document feed path R2, so as to gradually narrow the height of the path R2.

Provided on the underside of the document supporting portion 25 on the downstream side in the document feeding path R2, is a pair of roller supporting portions 27 (only one of which is only shown in FIG. 1). A roller opening 28 is formed between the roller supporting portions 27. A separation roller 29 that separates a plurality of documents one by one is rotatably supported in each of the roller supporting portions 27. The separation roller 29 is partially exposed above the document supporting portion 25, through the roller opening 28. A separation pad 31 attached to the underside of the document guiding portion 26 contacts the surface of the separation roller 29 exposed through the roller opening 28 in the document supporting portion 25. The separation roller 29 and the separation pad 31 cooperate to separate the documents one by one, forming a separation unit 30.

Provided downstream of the separation roller 29 in the document feeding path R2 are a line feed (LF) roller 32 and a pinch roller 33 that is disposed above the LF roller 32 and presses against the LF roller 32. The LF roller 32 and the pinch roller 33 are rotatably supported. The LF roller 32 is driven by the drive motor 57 and rotated though gears, as described below. Formed in the lower cover 3 downstream of the pinch roller 33 is a contact image sensor (CIS) unit 34 accommodated in a unit accommodating portion 3C. A document presser 35 presses against an upper portion of the CIS unit 34. The CIS unit 34 reads image data on a document which is line-fed while passing between the LF roller 32 and the pinch roller 33. Disposed downstream of the CIS unit 34 in the document feeding path R2 are a document discharge roller 36 and a pinch roller 37 that is disposed above the document discharge roller 36 and presses against the roller 36. The document discharge roller 36 and the pinch roller 37 discharge the document, whose image data has been read by the CIS unit 34, from the facsimile machine 1.

The upper panel plate 23 is provided with a keyboard 38 having numeral keys and various function keys. Various operations of the facsimile machine 1 are performed when relevant keys are pressed. A gear changing device 40 for selectively rotating the sheet pick-up roller 5, the platen roller 10, the ribbon take-up spool 21, the sheet discharge roller 17, the LF roller 32 and the document discharge roller 36 will be described, with referring to FIGS. 2 through 7.

Figure 2:
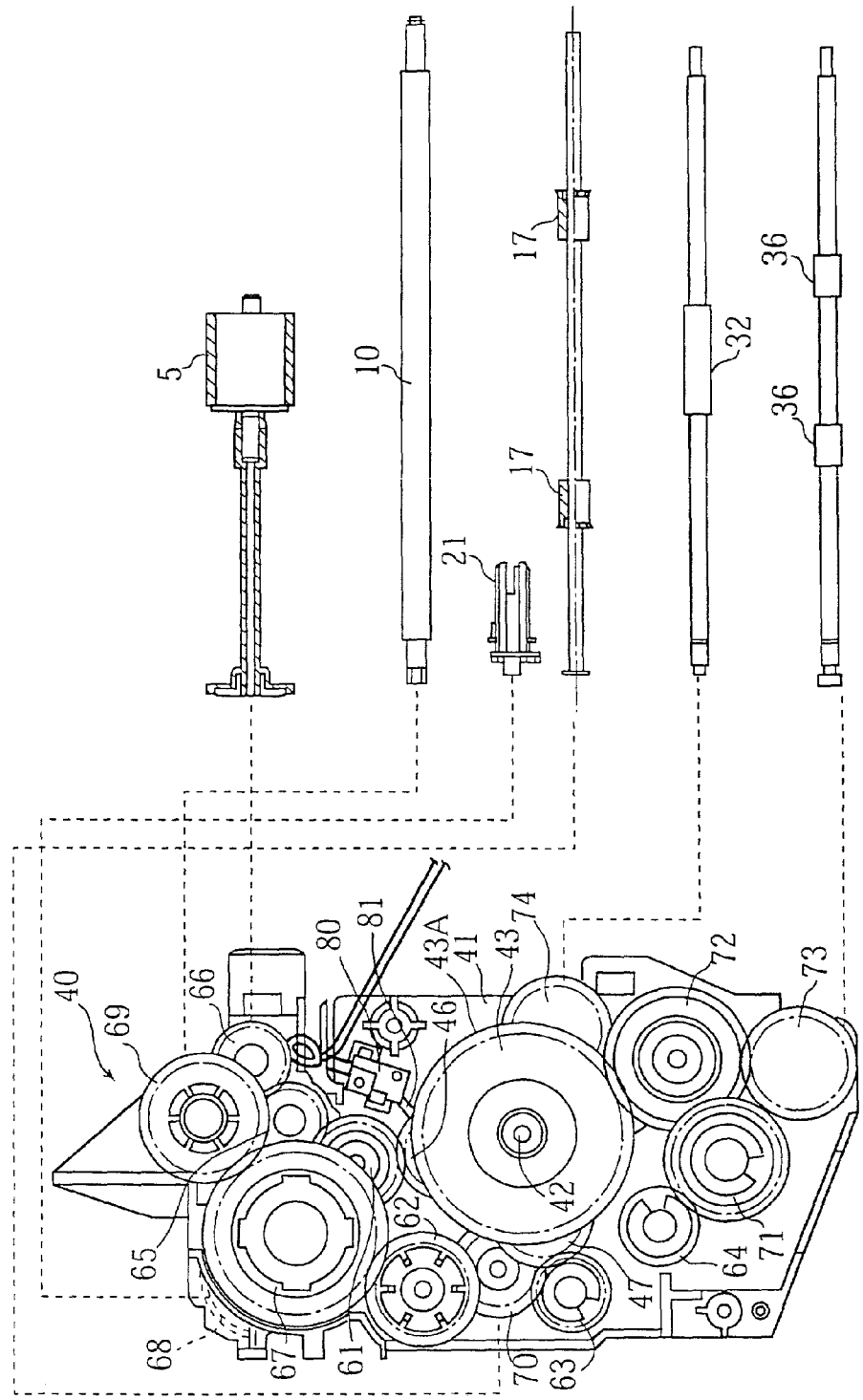
FIG. 2 is an explanatory view of the gear changing device.
Figure 3:
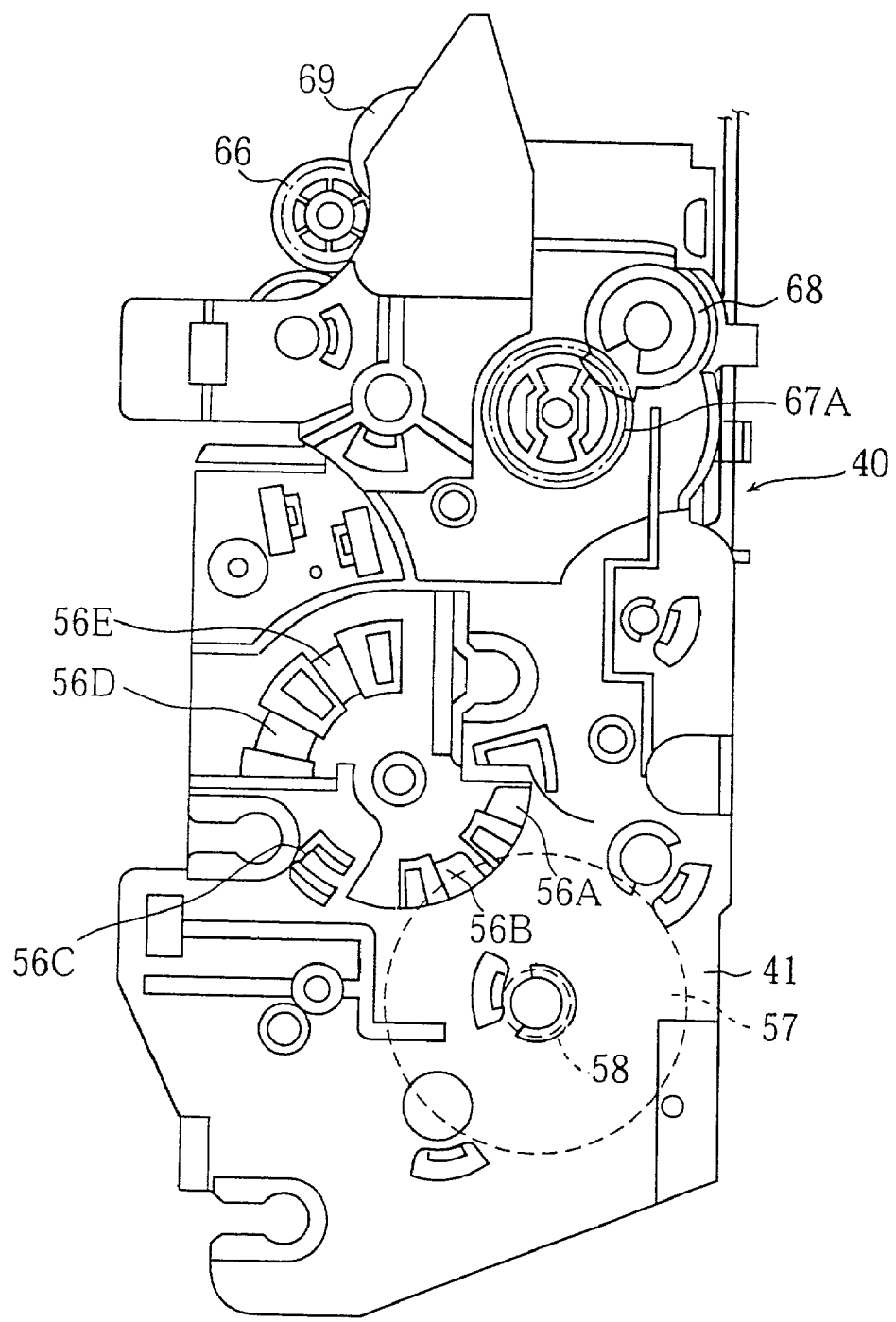
FIG. 3 is a plan view showing a rear side of the gear changing device.
Figure 4:
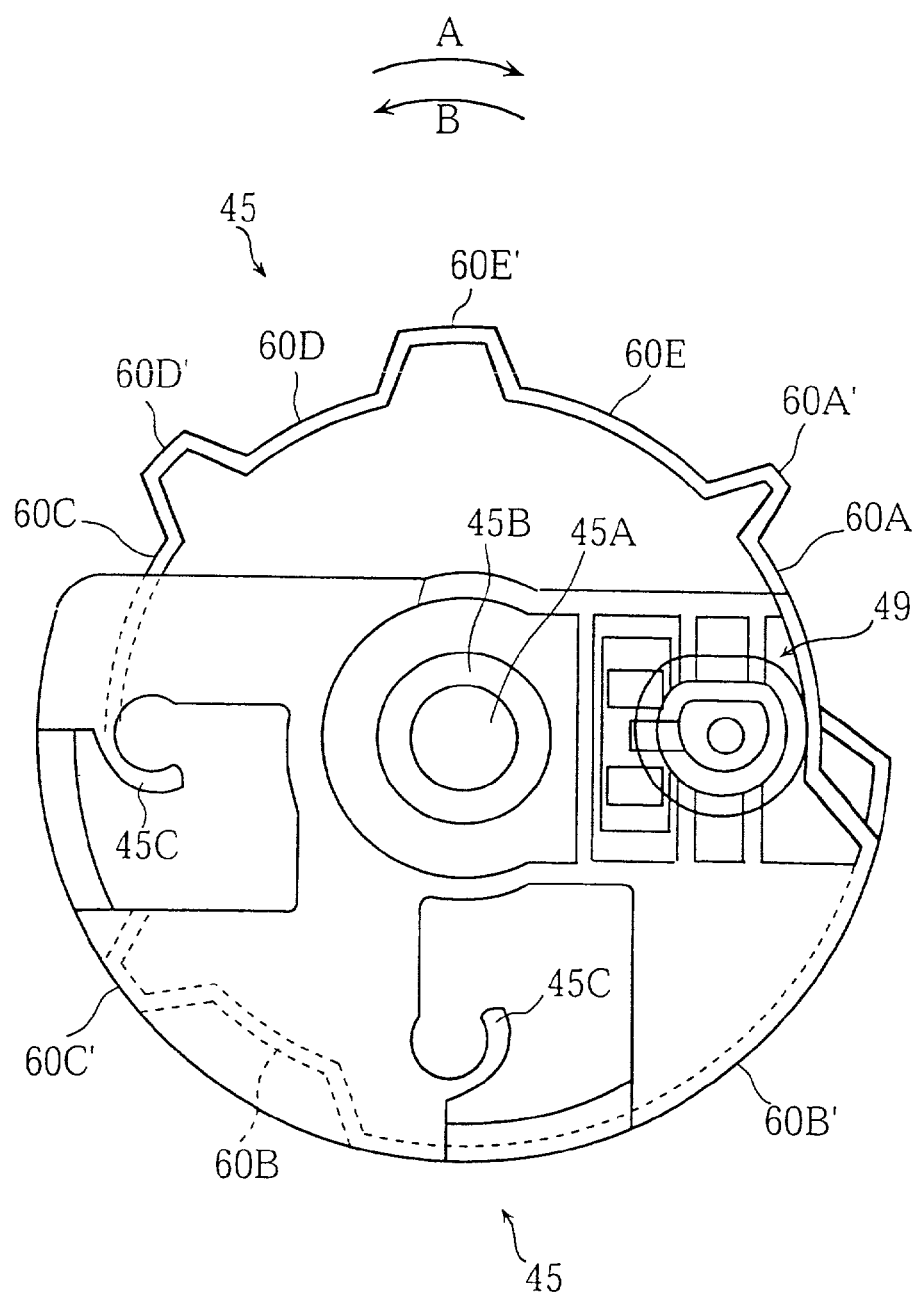
FIG. 4 is a plan view of a rotating member of the gear changing device.
Figure 5:
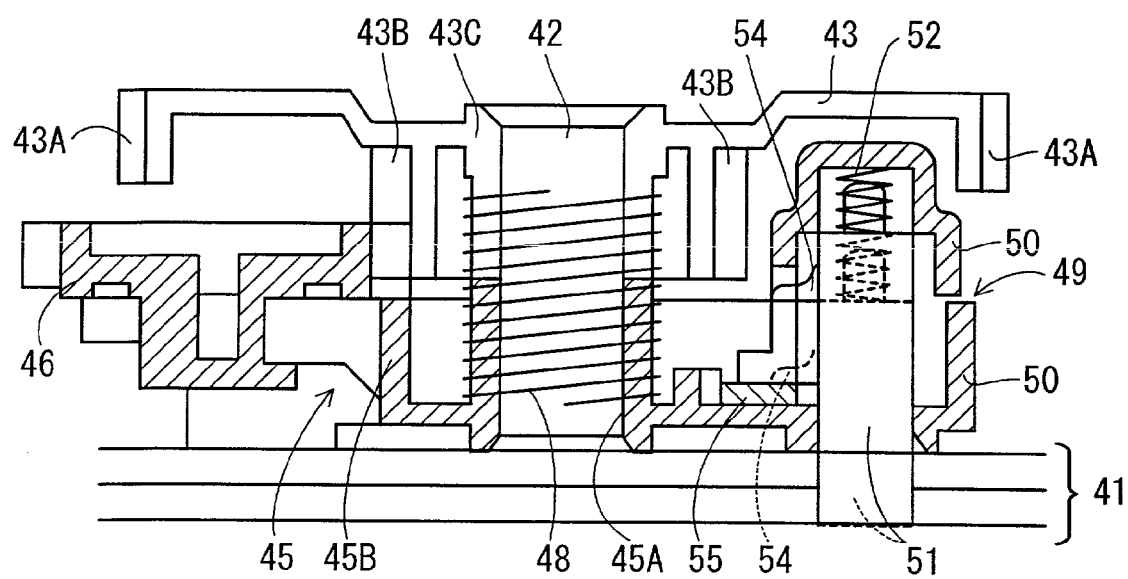
FIG. 5 is a sectional view showing a connection between a sun gear and the rotating member.
Figure 6:
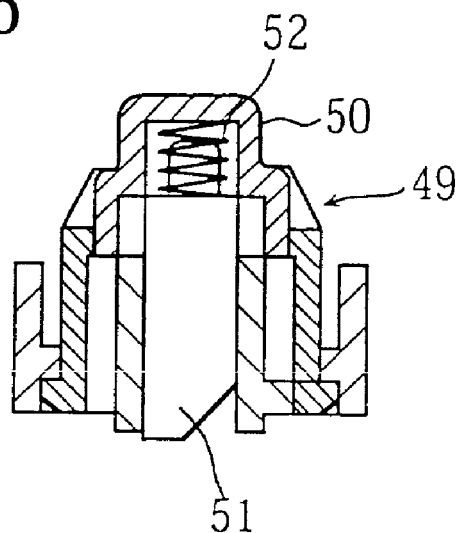
FIG. 6 is a sectional view of a regulating unit of the rotating member.
Figure 7:
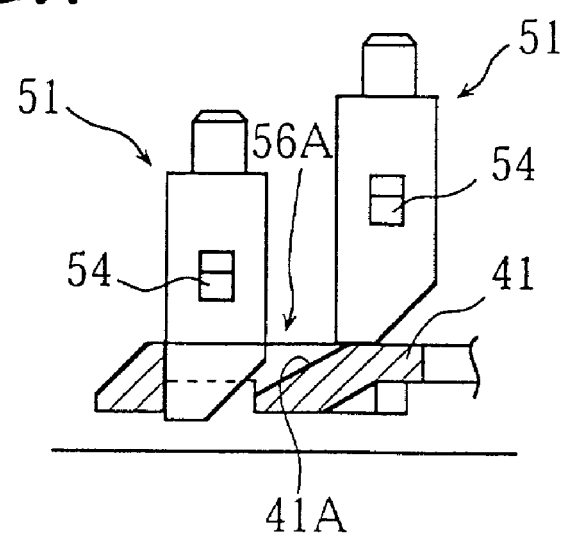
FIG. 7 is an explanatory view showing actions of a rotation regulating member of the regulating unit.

FIG. 2 is an explanatory view of the gear changing device 40. FIG. 3 is a plan view showing a rear side of the gear changing device 40. FIG. 4 is a plan view of a rotating member 45 of the gear changing device 40. FIG. 5 is a sectional view showing connection between a sun gear 43 and the rotating member 45. FIG. 6 is a sectional view of a regulating unit 49 of the rotating member 45. FIG. 7 is an explanatory view showing actions of a rotation regulating member 51 of the regulating unit 49.

In FIGS. 2 through 5, the gear changing device 40 has a base plate 41. A shaft 42 is integrally formed with the base plate 41. A sun gear 43 is rotatably supported by the shaft 42 on the base plate 41. Gear teeth 43A are formed on a circumference of the sun gear 43. Gear teeth 43B (FIG. 5) are formed on the underside of the sun gear 43.

Disposed below the sun gear 43 is a rotating member 45 rotatably supported by the shaft 42 which is inserted into a shaft hole 45A formed in the rotating member 45, as shown in FIGS. 4 and 5. The rotating member 45 is concentric with the sun gear 43 and can rotate about the shaft 42. As shown in FIG. 4, supporting portions 45C for rotatably supporting planetary gears 46, 47 are provided at such positions that the supporting portions 45C form a predetermined angle with the center of the rotating member 45. Each of the planetary gears 46, 47 are constantly engaged with the gear teeth 43B of the sun gear 43. When the sun gear 43 is rotated in one direction via the drive motor 57, each planetary gear 46, 47 rotates in the same direction on an axis thereof. It is to be noted that the sun gear 43 and each planetary gear 46, 47 are not illustrated in FIG. 4 and that the planetary gear 47 is not illustrated in FIG. 5.

A clutch spring 48 is disposed between a tubular shaft member 43C that is formed in the sun gear 43 and a tubular shaft member 45B that is formed in the rotating member 45. The tubular shaft member 43C in the sun gear 43 is inserted over the shaft 42. The tubular shaft member 45B in the rotating member 45 defines the shaft hole 45A which is inserted over the shaft 42. The clutch spring 48 generates greater torque (tightening torque) when the sun gear 43 is rotated in the counterclockwise direction in FIGS. 2 and 4 (as shown by the arrow B in FIG. 4, and this direction is hereinafter referred to as the forward direction). The clutch spring 48 generates smaller torque (loosening torque) when the sun gear 43 is rotated in the clockwise direction in FIGS. 2 and 4 (as shown by the arrow A in FIG. 4, and this direction is hereinafter referred to as the reverse direction). In other words, when the sun gear 43 is rotated by the drive motor 57 in the forward direction, greater frictional load is applied between the sun gear 43 and the rotating member 45, due to the tightening torque of the clutch spring 48. When the sun gear 43 is rotated by the drive motor 57 in the reverse direction, a frictional load smaller than that applied when the sun gear 43 is rotated in the forward direction, is applied between the sun gear 43 and the rotating member 45, due to the loosening torque of the clutch spring 48. More specifically, when the sun gear 43 is rotated by the drive motor 57 in the forward direction, the sun gear 43 and the rotating member 45 rotate together. When the sun gear 43 is rotated by the drive motor 57 in the reverse direction, the sun gear 43 and the rotating member 45 are independently rotatable.

A regulating unit 49 is provided at a position that is a predetermined distance from the center of the rotating member 45. When the sun gear 43 is rotated in the forward direction, the regulating unit 49 allows the rotating member 45 to rotate such that the planetary gears 46, 47 are pivotally rotated about the shaft 42. When the sun gear 43 is rotated in the reverse direction, the regulating unit 49 positions the rotating member 45 so as to allow each planetary gear 46, 47 to rotate on the axis thereof at a predetermined position.

Structures of the regulating unit 49 are described below, with reference to FIGS. 5 through 7 and FIG. 3. The regulating unit 49 includes a rotation regulating member 51 that is disposed inside a cover 50 so as to move up and down, and a pressing spring 52 that is disposed between the upper inner surface of the cover 50 and an upper end of the rotation regulating member 51 and that constantly presses the rotation regulating member 51 downward.

As shown in FIG. 5, formed on a side surface of the rotation regulating member 51 is a protrusion 54 that is guided upward or downward along a vertical slit 53 formed in the cover 50. A damper 55 is provided on the upper surface of the rotating member 45 where the damper 55 and the protrusion 54 face each other. When a lower end of the rotation regulating member 51 fits into a positioning hole (described below) formed in the base plate 41, the protrusion 54 is lowered due to the downward pressing force applied by the pressing spring 52, making the underside of the protrusion 54 contact the rotating member 45. The damper 55 reduces sounds generated at the time the underside of the protrusion 54 contacts the rotating member 45.

The positioning holes formed in the base plate 41 into which the rotation regulating member 51 is engaged or fitted, will be described, mainly referring to FIG. 3. As shown in FIG. 3, a plurality of positioning holes 56A, 56B, 56D, and 56E, as well as a positioning edge 56C are formed in the base plate 41 along an arc corresponding to the circumference of the sun gear 43 placed in position. The positioning hole 56A is associated with a sheet feeding operation. When the lower end of the rotation regulating member 51 fits into the positioning hole 56A, the sheet pick-up roller 5 is rotated by a drive force of the drive motor 57 through the gear changing device 40, as will be described in detail below.

The positioning hole 56B is associated with a recording operation by the thermal head 11 onto the recording sheet. When the lower end of the rotation regulating member 51 fits into the positioning hole 56B, the platen roller 10, the ribbon take-up spool 21, and the sheet discharge roller 17 are rotated by a drive force of the drive motor 57 through the gear changing device 40, as will be described in detail below.

The positioning edge 56C is associated with a copying operation. As will be described in detail below, when the lower end of the rotation regulating member 51 contacts the positioning edge 56C, the LF roller 32 and the document discharge roller 36 are rotated by a drive force of the drive motor 57 through the gear changing device 40, to read an image on a document. At the same time, the sheet discharge roller 17, the platen roller 10, and the ribbon take-up spool 21 are rotated to perform recording on the recording sheet.

The positioning hole 56D is associated with a sheet discharging operation after an image is recorded onto a recording sheet. When the lower end of the rotation regulating member 51 fits into the positioning hole 56D, the sheet discharge roller 17 is rotated by a drive force of the drive motor 57 through the gear changing device 40, as will be described in detail below.

The positioning hole 56E is associated with an image reading operation for reading an image on a document with the CIS unit 34. When the lower end of the rotation regulating member 51 fits into the positioning hole 56E, the LF roller 32 and the document discharge roller 36 are rotated by a drive force of the drive motor 57 through the gear changing device 40, as will be described in detail below.

The positioning holes 56A, 56B, 56D, 56E and the positioning edge 56C are disposed along the arc corresponding to the circumference of the sun gear 43. Such arrangements enable the various operations of the facsimile machine 1 to be performed consecutively, with a minimum rotation of the sun gear 43.

As shown in FIG. 3, the drive motor 57 (pulse motor) is disposed adjacent to the sun gear 43 on a front side of the base plate 41 (on the back side in FIG. 3). A pinion 58 is mounted on a drive shaft of the drive motor 57. The pinion 58 engages with the gear teeth 43A of the sun gear 43 on the front side of the base plate 41.

With reference to FIGS. 5 through 7, the engagement of the rotation regulating member 51 into the positioning holes 56A, 56B, 56D, 56E or with the positioning edge 56C when the rotating member 45 is rotated in the forward direction by the action of the clutch spring 48 as the sun gear 43 rotates in the forward direction, will be described below. It is to be noted that FIG. 7 only illustrates the positioning hole 56A as an example, however, substantially the same principle can be applied to other positioning holes 56B, 56D, 56E, as well as the positioning edge 56C.

As the sun gear 43 rotates in the forward direction, greater toque is generated between the sun gear 43 and the rotating member 45 with the action of the clutch spring 48. Consequently, the rotating member 45 starts to rotate in the same direction as the sun gear 43. When the rotation regulating member 51 does not fit into the positioning hole 56A, 56B, 56D, 56E, or contact the positioning edge 56C, the lower end of the rotation regulating member 51 contacts the upper surface of the base plate 41. In this state, the lower end of the rotation regulating member 51 is located at a position indicated by a solid line in FIG. 5. As shown in FIGS. 5 and 6, the pressing spring 52 is held under compression.

As the rotating member 45 is further rotated, the lower end of the rotation regulating member 51 is eventually engaged in the positioning hole 56A, 56B, 56D, 56E, or contacts the positioning edge 56C, as shown by dotted lines in FIG. 5 and by a left-side figure in FIG. 7. As the sun gear 43 is rotated in the reverse direction in the state that the lower end of the rotation regulating member 51 engages in the positioning hole 56A, 56B, 56D, 56E, or contacts the positioning edge 56C, according to the rotation of the drive motor 57 and the pinion 58, the frictional load applied between the sun gear 43 and the rotating member 45 is decreased by the action of the clutch spring 48. Accordingly, the force as the rotating member 45 tries to rotate in the reverse direction following the rotation of the sun gear 43 becomes insignificant, or very small. In addition, the regulating unit 49 regulates the rotation of the rotating member 45, so that the rotating member 45 does not rotate together with the sun gear 43 in the reverse direction, but stops rotating.

Because each planetary gear 46, 47 is constantly engaged with the gear teeth 43B of the sun gear 43, each planetary gear 46, 47 rotates in the same direction on the axis thereof, as the sun gear 43 rotates in the reverse direction. In this state, the frictional load applied between the sun gear 43 and the rotating member 45 is decreased and the rotating member 45 is positioned by the regulating unit 49, so that the drive force of the drive motor 57 is efficiently transmitted to transmission gears (described below), through the sun gear 43 and the planetary gears 46, 47. Therefore, a motor that provides a relatively small drive force may be used.

As the sun gear 43 is rotated again in the forward direction after being rotated in the reverse direction, the greater frictional load is applied between the sun gear 43 and the rotating member 45, due to the action of the clutch spring 48. Accordingly, the rotating member 45 is again rotated in the forward direction along with the sun gear 43 rotating in the forward direction. The planetary gears 46, 47 pivot about the shaft 42 around the sun gear 43. At this time, as shown in a right-side figure in FIG. 7, the lower end of the rotation regulating member 51 is guided upwardly along a tilt 41A formed in the base plate 41 near the positioning holes 56A, 56B, 56D, 56E and the positioning edge 56C. Then, the lower end of the rotation regulating member 51 comes into contact with the upper surface of the base plate 41.

The rotation regulating member 51 can be disengaged from the positioning holes 56A, 56B, 56D, 56E or the positioning edge 56C only in one direction. Therefore, the rotating member 45 is continuously rotatable only in the same direction as the sun gear 43 rotating in the forward direction. As the sun gear 43 starts to rotate in the reverse direction, the rotating member 45 follows the rotation of the sun gear 43 and is slightly rotated in the reverse direction.

Referring back to FIG. 4, the rotating member 45 is described. A plurality of recesses 60A, 60B, 60C, 60D, 60E having a depth in the diametrical direction of the rotating member 45 and a plurality of projections 60A', 60B', 60C', 60D', 60E' having a height in the diametrical direction of the rotating member 45 are alternately and integrally formed in the outer periphery of the rotating member 45. Each recess 60A, 60B, 60C, 60D, 60 and each projection 60A', 60B', 60C', 60D', 60E' has a different width along the circumferential direction of the rotating member 45. In this embodiment, the recess 60A, 60B, 60C, 60D, 60E and the projection 60A', 60B', 60C', 60D', 60E' adjacent to each other are paired, so that a total of five pairs are provided to correspond to the above-described five operations of facsimile machine 1, that is, the sheet feeding operation, recording operation, copying operation, sheet discharging operation, and image reading operation. While the rotating member 45 is rotating, the projections 60A', 60B', 60C', 60D', 60E' come into contact with or out of contact with a switch terminal 81 of a sensor switch 80 (in FIG. 2), thereby changing a level of a signal output from the sensor switch 80 into ON or OFF. The operations of the facsimile machine 1 are controlled by a central processing unit (CPU) 101, based on the signals outputted from the sensor switch 80, as will be described below.

Transmission of the drive force through the gear changing device 40 to the sheet pick-up roller 5, the platen roller 10, the ribbon take-up spool 21, the sheet discharge roller 17, the LF roller 32, and the document discharge roller 36 will be described with reference to FIG. 2. In FIG. 2, four transmission gears of a first transmission gear 61, a second transmission gear 62, a third transmission gear 63, and a fourth transmission gear 64 are provided so as to be rotatably supported on the base plate 41, along a path of the planetary gears 46, 47 that pivotally rotate when the rotating member 45 rotates in the forward direction. The transmission gears 61 through 64 are engaged with the planetary gears 46, 47 at a position where the rotating member 45 is stopped by the rotation regulating member 51 engaging in the positioning holes 56A, 56B, 56D, 56E or contacting the positioning edge 56C. The transmission gear 61 through 64 is rotated as the planetary gear 46, 47 rotates on its axis in association with the rotation of the sun gear 43.

The first transmission gear 61 is engaged with a driven gear 65, which is engaged with another driven gear 66. The driven gear 66 is connected to the sheet pick-up roller 5 through a gear train. As the lower end of the rotation regulating member 51 engages in the positioning hole 56A while the rotating member 45 is rotating, the planetary gear 47 and the first transmission gear 61 are engaged with each other. Thus, a drive force transmission path to the sheet pick-up roller 5 is formed with the planetary gear 47, the first transmission gear 61, and the driven gears 65, 66. Accordingly, the sheet pick-up roller 5 is driven, as the sun gear 43 is rotated in the reverse direction with the lower end of the rotation regulating member 51 engaged in the positioning hole 56A. The sheet feeding operation is thus performed.

The second transmission gear 62 is engaged with a driven gear 67 which has a driven gear 67A (FIG. 3) integrally formed with the driven gear 67 at a lower side thereof. The driven gear 67A is engaged with another driven gear 68, which is supported on the rear side of the base plate 41, as shown in FIG. 3. The driven gear 68 is connected to the ribbon take-up spool 21 through a gear train. As the lower end of the rotation regulating member 51 engages in the positioning hole 56B while the rotating member 45 is rotating, the planetary gear 47 and the second transmission 62 are engaged with each other. Thus, a drive force transmission path to the ribbon take-up spool 21 is formed with the planetary gear 47, the second transmission 62, and the driven gears 67, 67A, 68. The driven gear 67 is also engaged with a driven gear 69. The driven gear 69 is connected to the platen roller 10 through a gear train. Similarly, a drive force transmission path to the platen roller 10 is formed with the planetary gear 47, the second transmission gear 62, and the driven gears 67, 69, when the lower end of the rotation regulating member 51 engages in the positioning hole 56B.

Disposed below the second transmission gear 62 is a driven gear (not shown) that engages with another driven gear 70. The driven gear 70 is connected to the sheet discharge roller 17 through a gear train. Similarly, a drive force transmission path to the sheet discharge roller 17 is formed with the planetary gear 47, the second transmission gear 62, the driven gear (not shown) disposed below the second transmission gear 62, and the driven gear 70, when the lower end of the rotation regulating member 51 engages in the positioning hole 56B. At this time, the driven gear 70 is engaged with the third transmission gear 63, and accordingly, the third transmission gear 63 is rotated. However, the third transmission gear 63 does not transmit the drive force to the other gears. As the sun gear 43 is rotated in the reverse direction with the lower end of the rotation regulating member 51 engaged in the positioning hole 56B, the ribbon take-up spool 21, the platen roller 10, and the sheet discharge roller 17 are driven and the recording operation is performed.

The third transmission gear 63 is engaged with the driven gear 70, as described above. The fourth transmission gear 64 is engaged with a driven gear 71. Disposed below the driven gear 71 is a driven gear (not shown) which is integrally formed with the driven gear 71. The driven gear (not shown) disposed below the driven gear 71 is engaged with a driven gear 72 that is also engaged with another driven gear 73. The driven gear 73 is connected to the document discharge roller 36 though a gear train. A driven gear (not shown) disposed below the driven gear 72 is engaged with another driven gear 74. The driven gear 74 is connected to the LF roller 32 through a gear train. As the lower end of the rotation regulating member 51 contacts the positioning edge 56C while the rotating member 45 is rotating, the planetary gear 47 engages with the fourth transmission gear 64 and the planetary gear 46 engages with the second transmission gear 62. In this state, two transmission gears 62, 64 are selected at the same time. When the lower end of the rotation regulating member 51 contacts the positioning edge 56C, a drive force transmission path to the document discharge roller 36 is formed with the planetary gear 47, the fourth transmission gear 64, the driven gear 71, the driven gear (not shown) disposed below the driven gear 71, and the driven gear 73. At the same time, a drive force transmission path to the LF roller 32 is formed with the planetary gear 47, the fourth transmission gear 64, the driven gear 71, the driven gear (not shown) disposed below the driven gear 71, the driven gear 72, the driven gear (not shown) below the driven gear 72, and the driven gear 74.

Because the planetary gear 46 is engaged with the second transmission gear 62, the drive force transmission path to the ribbon take-up spool 21 is formed with the second transmission gear 62, the driven gear 67, the driven gear 67A disposed below the driven gear 67 on the rear side of the base plate 41, and the driven gear 68. The drive force transmission path to the platen roller 10 is formed with the second transmission gear 62, and the driven gears 67, 69, and the drive force transmission path to the sheet discharge roller 17 is formed with the second transmission gear 62, the driven gear (not shown) disposed below the second transmission gear 62, and the driven gear 70, as described above. Accordingly, the LF roller 32 and the document discharge roller 36, as well as the ribbon take-up spool 21, the platen roller 10 and the sheet discharge roller 17 are driven, as the sun gear 43 is rotated in the reverse direction with the lower end of the rotation regulating member 51 contacting the positioning edge 56C. The copying operation is thus performed.

As the lower end of the rotation regulating member 51 engages the positioning hole 56D while the rotating member 45 is rotating, the planetary gear 46 and the third transmission 63 are engaged with each other. Thus, a drive force transmission path to the sheet discharge roller 17 is formed with the planetary gear 46, the third transmission 63, and the driven gear 70. At this time, the planetary gear 47 rotates without engaging any transmission gears 61 through 64. The driven gear 70 and the driven gear disposed below the second transmission gear 62 are engaged with each other. However, due to the action of a clutch spring (not shown) provided between the second transmission gear 62 and the driven gear disposed below the gear 62, the second transmission gear 62 and the driven gear below the gear 62 are disconnected. Therefore, the rotation of the driven gear 70 is not transmitted to the second transmission gear 62.

When the sheet discharge roller 17 is rotated by the drive force transmitted through the relevant drive force transmission path formed as described above, the second transmission gear 62 is not rotated. Therefore, the drive force transmission path formed with the second transmission gear 62 and the driven gears 67, 68 is disconnected and consequently, the ribbon take-up spool 21 is not driven. Thus, a waste of the ribbon 20 is prevented. As the sun gear 43 is rotated in the reverse direction with the lower end of the rotation regulating member 51 engaged in the positioning hole 56D, only the sheet discharge roller 17 is driven and the sheet discharging operation is performed.

As the lower end of the rotation regulating member 51 engages in the positioning hole 56E while the rotating member 45 is rotating, the planetary gear 46 and the fourth transmission 64 are engaged with each other. Thus, the drive force transmission path to the document discharge roller 36 is formed with the planetary gear 46, the fourth transmission 64, the driven gear 71, the driven gear disposed below the driven gear 71, and the driven gear 73. At the same time, the drive force transmission path to the LF roller 32 is formed with the planetary gear 46, the fourth transmission gear 64, the driven gear 71, the driven gear disposed below the driven gear 71, and the driven gears 72, 74. Accordingly, the document feed roller 36 and the LF roller 32 are driven, as the sun gear 43 is rotated in the reverse direction with the lower end of the rotation regulating member 51 engaged in the positioning hole 56E. The image reading operation to read an image on a document is thus performed.

In order to rotate the rotating member 45 in association with the rotation of the sun gear 43 in the forward direction to such a position that any of the transmission gears 61 through 64 is rotated, the planetary gears 46, 47 need to be pivotally rotated so as to pass across any of the irrelevant transmission gears 61 through 64 for desired operations and to engage with the desired transmission gears 61 through 64. This requires a large amount of drive force, and great frictional load between the sun gear 43 and the rotating member 45, which is obtained using the tightening torque of the clutch spring 48. When the rotating member 45 does not have to rotate in association with the reverse rotation of the sun gear 43, the frictional load between the rotating member 45 and the sun gear 43 is reduced using the loosening torque of the clutch spring 48, to rotate the planetary gears 46, 47 on their axis. While the sun gear 43 rotates in the reverse direction, the rotating member 45 is positioned by the regulating unit 49 and stopped, and the rotation of the sun gear 43 is transmitted to the planetary gears 46, 47. With the clutch spring 48, the frictional load applied between the sun gear 43 and the rotating member 45 is changed according to the rotating directions of the sun gear 43.

Referring to FIGS. 8 through 19, operations of the gear changing device 40 that switches the drive force transmission paths will be described below in association with the basic three operation modes of the facsimile machine 1, that is, a transmission mode, a reception mode, and a copying mode. In the transmission mode, the image reading operation for reading an image on a document is performed with the CIS unit 34 by rotating the LF roller 32 and the document discharge roller 36, as well as a data transmitting operation for transmitting the read image data to another facsimile machine. In the reception mode, an image recording operation and a sheet discharging operation are performed. More specifically, the recording sheet is first fed using the sheet pick-up roller 5. Thereafter, the platen roller 10 and the sheet discharge roller 17 are rotated while the ribbon 20 is fed using the ribbon take-up spool 21, to record image data received from another facsimile machine onto a recording sheet with the thermal head 11. Then, the recording sheet is discharged from the facsimile machine 1. In the copying mode, the image reading operation, which is performed in the transmission mode and the image recording operation, which is performed in the reception mode, are performed at the same time.

The facsimile machine 1 includes a control unit that controls operations of the facsimile machine 1 including the gear changing device 40. It is widely known that such a control unit operates with a central processing unit (CPU) 101 serving as the center of controls, based on programs stored in a read-only memory (ROM) 105. Therefore, general structure of the control unit of the facsimile machine 1 will be briefly described with reference to FIG. 20.

The CPU 101 of the control unit in the facsimile machine 1 controls drive pulses to be applied to the drive motor 57 and the rotating directions of the drive motor 57, based on the ON/OFF level of the signals inputted from the sensor switch 80. In this embodiment, as the switch terminal 81 of the sensor switch 80 contacts the projection 60A', 60B', 60C', 60D', 60E' of the rotating member 45, the CPU 101 detects, based on the signal output from the sensor switch 80, that the sensor switch 80 is turned on. As the switch terminal 81 comes out of contact with the projection 60A', 60B', 60C', 60D', 60E' into the recess 60A, 60B, 60C, 60D, 60E, the CPU 101 detects, based on the signal output from the sensor switch 80, that the sensor switch 80 is turned off. Alternatively, when the switch terminal 81 contacts the projection 60A', 60B', 60C', 60D', 60E', the OFF signal may be output from the sensor switch 80. When the switch terminal 81 is in the recess 60A, 60B, 60C, 60D, 60E, the ON signal may be output from the sensor switch 80.

Figure 20:
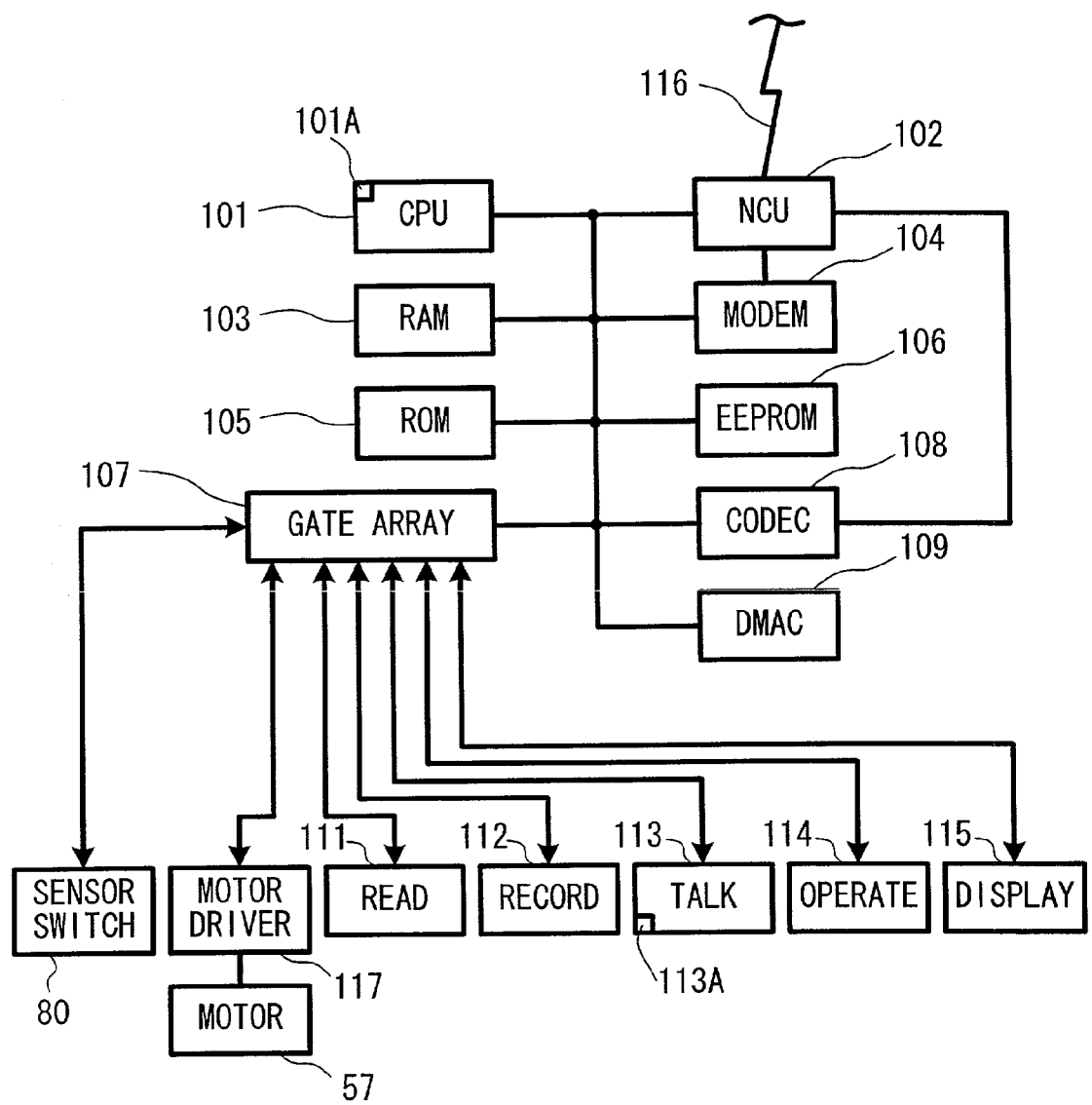
FIG. 20 is a block diagram of the facsimile machine according to an exemplary embodiment of the invention.

As shown in FIG. 20 illustrating a block diagram of the facsimile machine 1 of a communication apparatus, the facsimile machine 1 includes a central processing unit (CPU) 101, a network control unit (NCU) 102, a random-access memory (RAM) 103, a modem 104, a read-only memory (ROM) 105, an electrically erasable programmable read-only memory (EEPROM) 106, a gate array 107, a coder/decoder (CODEC) 108, a direct memory access controller (DMAC) 109, an image reading unit 111, a recording unit 112, a talk unit 113, an operation panel 114, a display 115, a motor driver 117, and a sensor switch 80. The CPU 101, the NCU 102, the RAM 103, the modem 104, the ROM 105, the EEPROM 106, the gate array 107, the CODEC 108, and the DMAC 109 are interconnected by a bus line. The bus line includes address bus, data bus, and control signal lines. The image reading unit 111, the recording unit 112, the talk unit 113, the operation panel 114, the display 115, the motor driver 117, and the sensor switch 80 are connected to the gate array 107. A drive motor 57 is connected to the motor driver 117 and driven by the motor driver 117. The NCU 102 is also connected to the modem 104. The talk unit 113 includes a speaker 113A.

The CPU 101 controls the operations of the facsimile machine 1. The NCU 102, which is connected to a public telephone line 116, performs the network controls. The RAM 103 stores various kinds of data. The modem 104 modulates transmission data and demodulates receiving data. The ROM 105 stores various kinds of programs and initial setting values. The EEPROM 106 stores various kinds of flags, such as an initial value flag, and various setting value data. The gate array 107 functions as an input/output interface of the CPU 101, and performs image and sound processing. The CODEC 108 encodes the transmission facsimile data and decodes the receiving facsimile data. The DMAC 109 writes data into and reads data from the RAM 103 and the EEPROM 106.

The image reading unit 111 has the CIS unit 34. The image reading unit 111 reads an image from a document and outputs an analog image signal. The recording unit 112 has a printer mechanism, such as the thermal head 11. The recording unit 112 records a received image or read image onto a recording sheet. The talk unit 113 includes a calling mechanism, such as a microphone (not shown) and the speaker 113A. The talk unit 113 inputs and outputs the receiving and transmitting sounds. The operation panel 114 is used by a user to perform various operations and includes the keyboard 38. The operation panel 114 outputs a signal corresponding to the operation performed by the user. The display 115 has a liquid crystal display (LCD) that displays various information, such as identification information of the telephone number of a receiver or called party and an error message, under the controls of the CPU 101. The speaker 113A of the talk unit 113 is used when the voice communication is performed with a user of a remote communication apparatus, as well as to notify a user of an occurrence of an error by issuing a sound, which will be described below.

Figure 8:
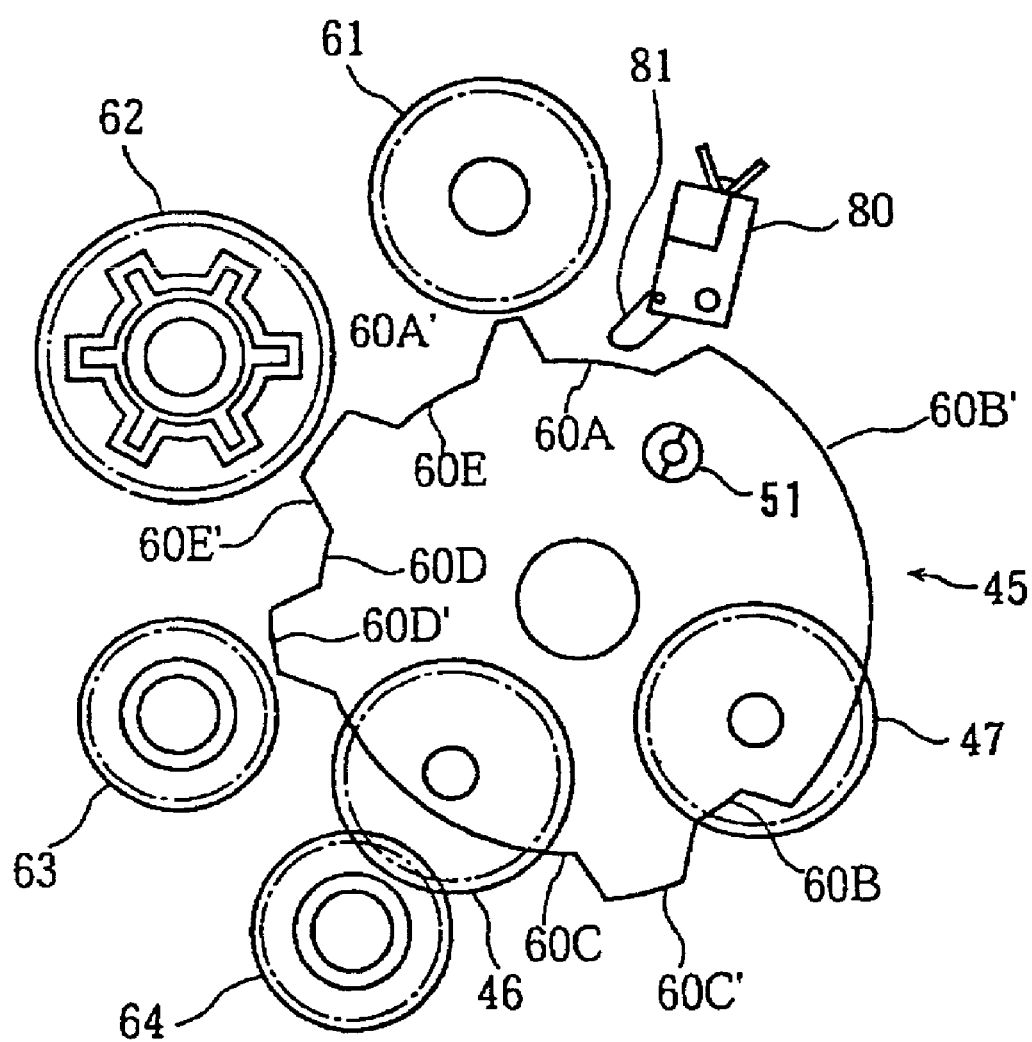
FIG. 8 is an explanatory view of a principal portion of the gear changing device when an image on a document is read.
Figure 9:
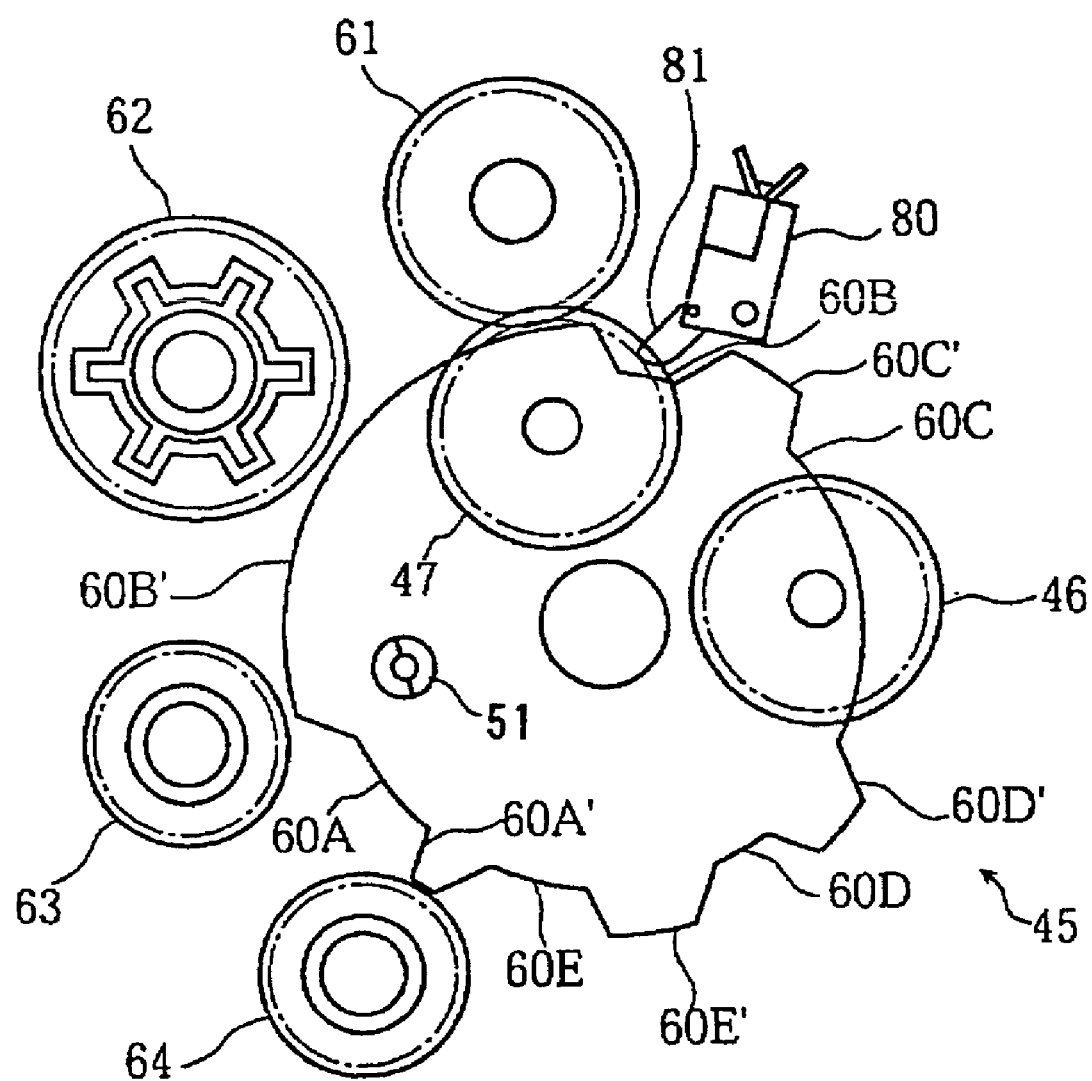
FIG. 9 is an explanatory view of the principal portion of the gear changing device when a recording sheet is fed.
Figure 10:
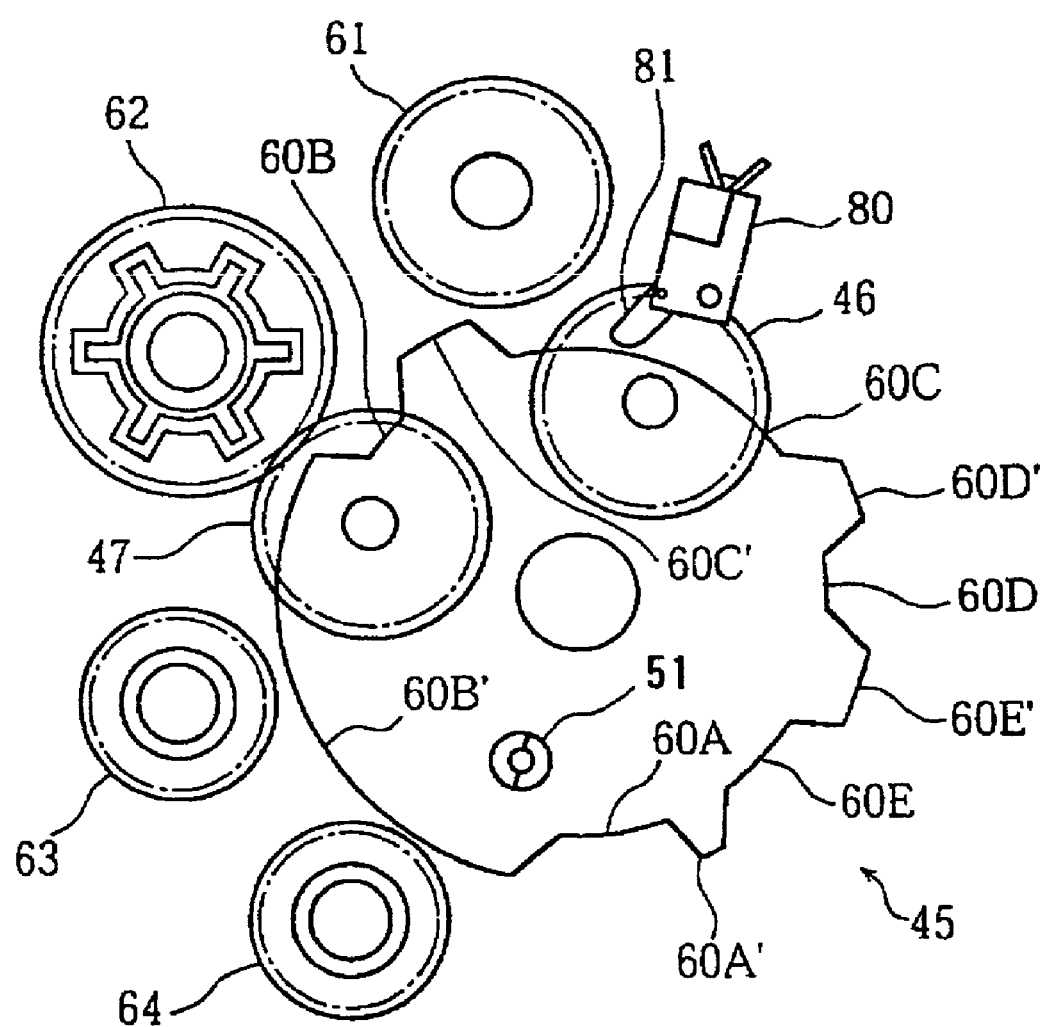
FIG. 10 is an explanatory view of the principal portion of the gear changing device when recording is performed on the recording sheet.
Figure 11:
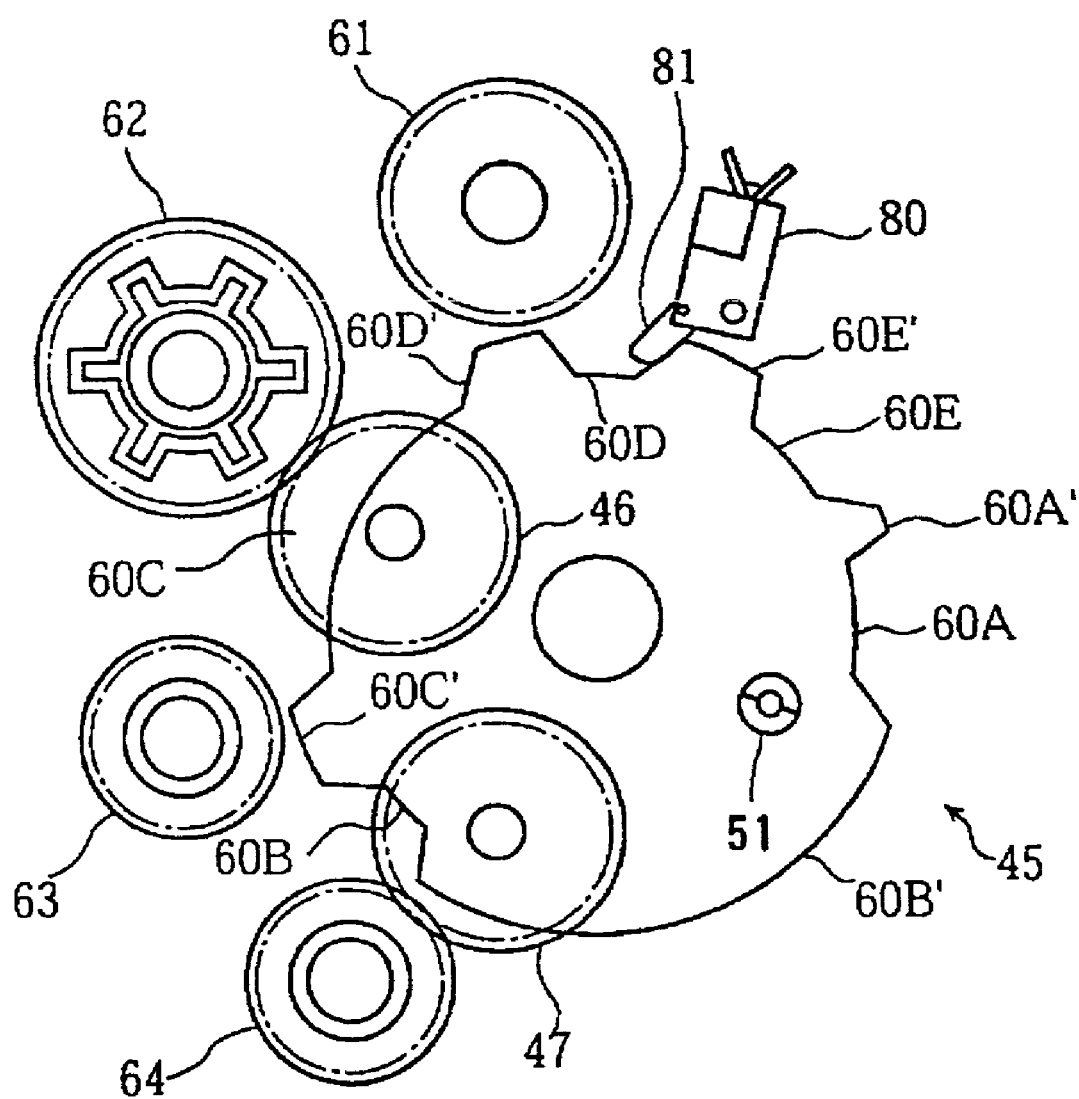
FIG. 11 is an explanatory view of the principal portion of the gear changing device when reading of the image on the document and recording onto the recording sheet are performed simultaneously.
Figure 12:
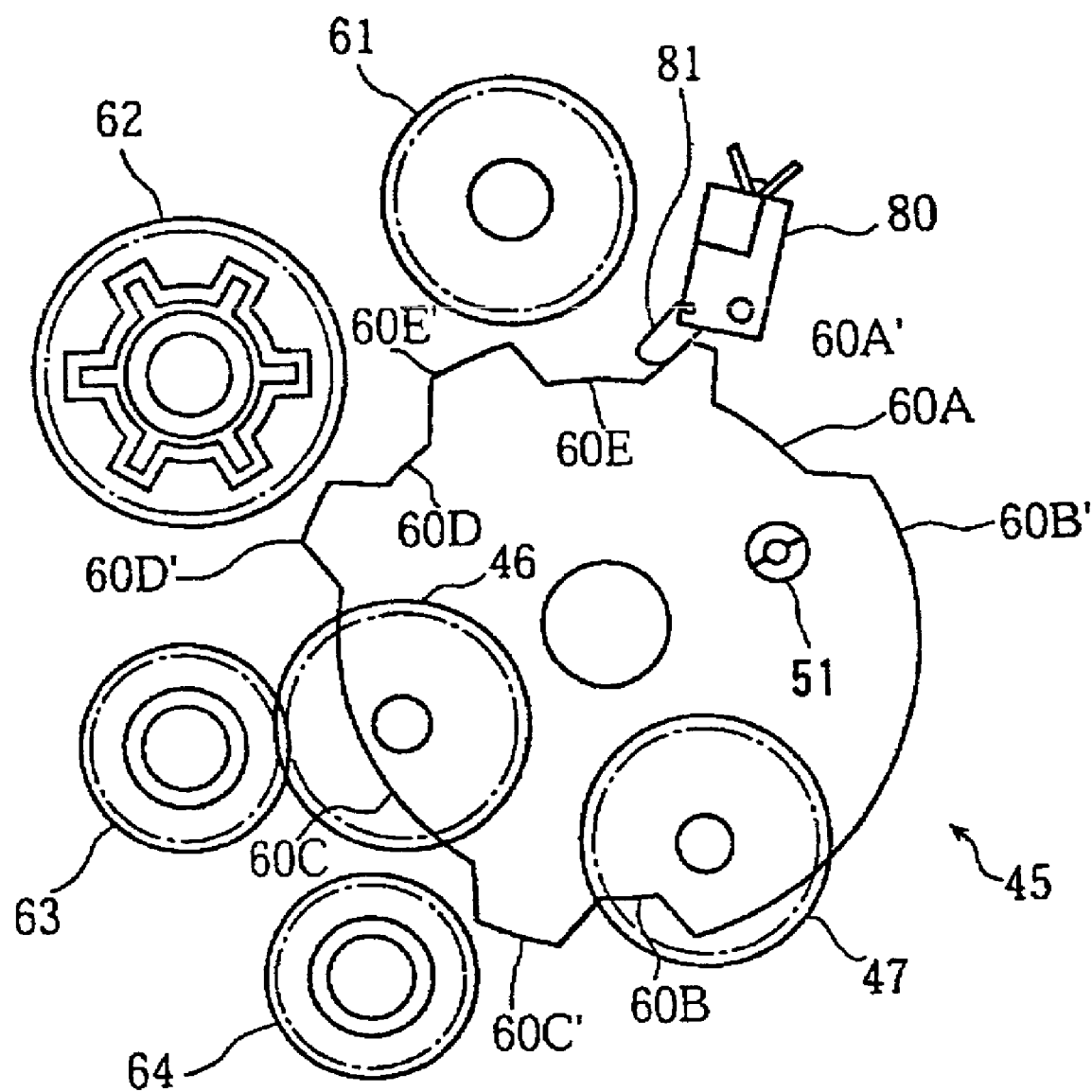
FIG. 12 is an explanatory view of the principal portion of the gear changing device when the recording sheet is discharged.
Figure 13:
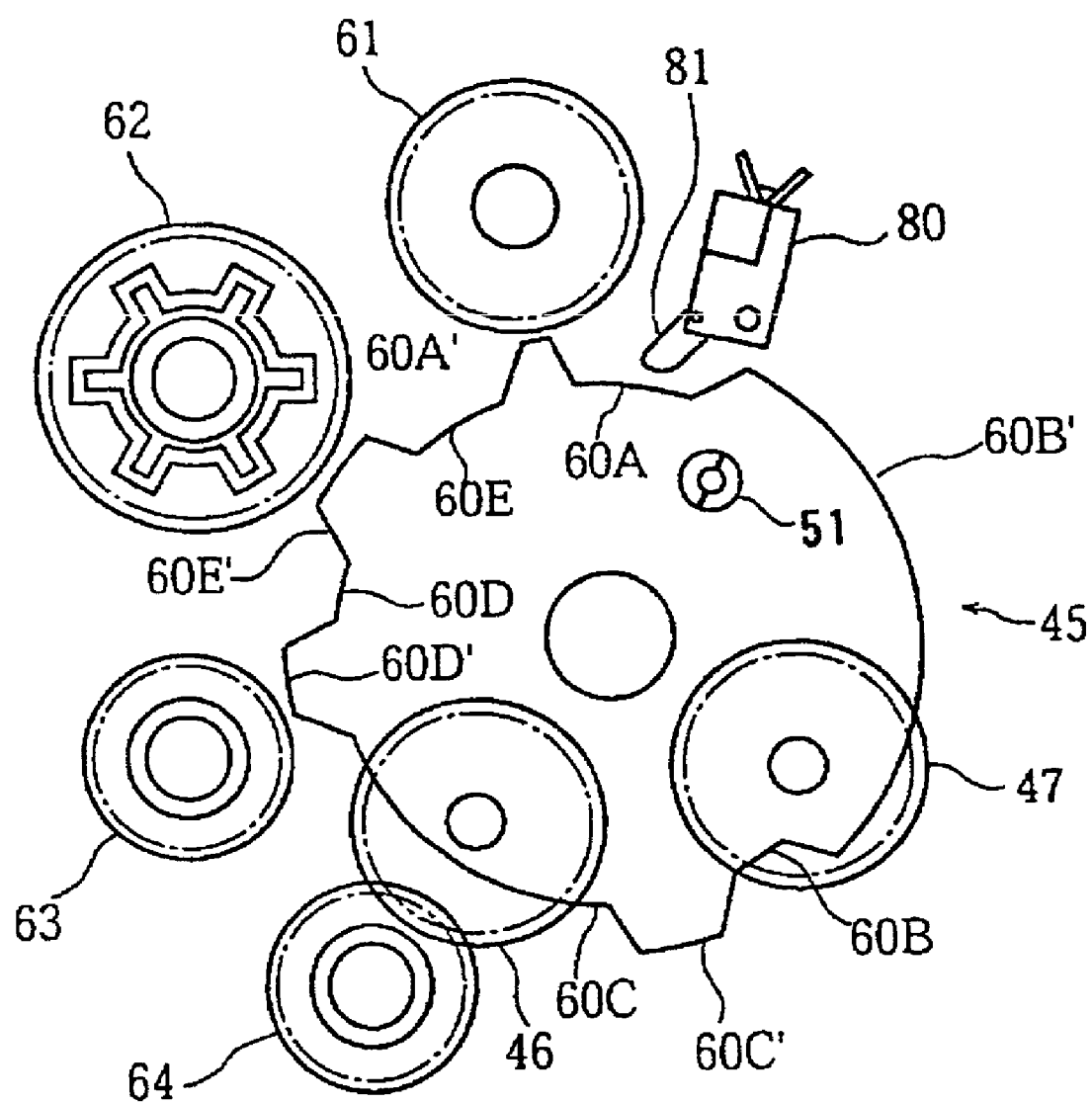
FIG. 13 is an explanatory view of the principal portion of the gear changing device when the facsimile machine is on standby.

FIG. 8 shows a principal portion of the gear changing device 40 when an image on a document is read. FIG. 9 shows the principal portion of the gear changing device 40 when a recording sheet is fed. FIG. 10 shows the principal portion of the gear changing device 40 when recording is performed onto the recording sheet. FIG. 11 shows the principal portion of the gear changing device 40 when reading of the image on the document and recording onto the recording sheet are performed simultaneously. FIG. 12 shows the principal portion of the gear changing device 40 when the recording sheet is discharged. FIG. 13 shows the principal portion of the gear changing device 40 when the facsimile machine 1 is on standby.

Referring to FIGS. 8 through 13, a mechanical movement of the gear changing device 40 is described. To execute operations in the transmission mode of the facsimile machine 1, the facsimile machine 1 needs to drive the LF roller 32 and the document discharge roller 36. The control unit controls the drive motor 57 to rotate the sun gear 43 in the forward direction such that the lower end of the rotation regulating member 51 in the regulating unit 49 engages the positioning hole 56E formed in the base plate 41. When the lower end of the rotation regulating member 51 engages in the positioning hole 56E in the base plate 41, the switch terminal 81 of the sensor switch 80 is located in the recess 60A formed in the rotating member 45, as shown in FIG. 8.

In the state that the rotation regulating member 51 engages the positioning hole 56E, the drive force transmission path to the document discharge roller 36 is formed, as described above, with the planetary gear 46, the forth transmission gear 64, the driven gear 71, the driven gear below the driven gear 71, and the driven gear 73. At the same time, the drive force transmission path to the LF roller 32 is formed with the planetary gear 46, the fourth transmission 64, the driven gear 71, the driven gear below the driven gear 71, and the driven gears 72, 74.

When the control unit controls the drive motor 57 to rotate the sun gear 43 in the reverse direction in the state that the rotation regulating member 51 engages the positioning hole 56E, the rotating member 45 does not follow the rotation of the sun gear 43 due to the action of the clutch spring 48, so that each of the planetary gears 46, 47 is not pivotally rotated, but rotates on its axis in association with the rotation of the sun gear 43. The LF roller 32 and the document discharge roller 36 are rotated by the drive force transmitted through the respective path, so as to feed a document along the document feeding path R2 in FIG. 1. While the document is being fed, an image on the document is read by the CIS unit 34. The read image data is transmitted to another facsimile machine under the control of the control unit.

To execute operations in the reception mode of the facsimile machine 1, the facsimile machine 1 needs to drive the sheet pick-up roller 5 in order to perform the sheet feeding operation. The control unit controls the drive motor 57 to rotate the sun gear 43 in the forward direction such that the lower end of the rotation regulating member 51 in the regulating unit 49 engages the positioning hole 56A formed in the base plate 41. When the lower end of the rotation regulating member 51 engages the positioning hole 56A in the base plate 41, the switch terminal 81 of the sensor switch 80 is located in the recess 60B formed in the rotating member 45, as shown in FIG. 9. In the state that the rotation regulating member 51 engages the positioning hole 56A, the drive force transmission path to the sheet pick-up roller 5 is formed, as described above, with the planetary gear 47, the first transmission gear 61, and the driven gears 65, 66.

When the control unit controls the drive motor 57 to rotate the sun gear 43 in the reverse direction in the state that the rotation regulating member 51 engages the positioning hole 56A, the rotating member 45 does not follow the rotation of the sun gear 43 due to the action of the clutch spring 48, so that each of the planetary gears 46, 47 are pivotally rotated, but rotate on their axis in association with the rotation of the sun gear 43. The sheet pick-up roller 5 is rotated by the drive force transmitted through the drive force transmission path to the roller 5, and accordingly the recording sheet is fed from the sheet stacker 4.

After the recording sheet is fed by a predetermined amount, the control unit controls the drive motor 57 to rotate the sun gear 43 in the forward direction to make the facsimile machine 1 ready to execute the next recording operation. When the sun gear 43 is rotated in the forward direction, the frictional load between the sun gear 43 and the rotating member 45 is increased due to the action of the clutch spring 48. Therefore, the rotating member 45 rotates following the sun gear 43 in the same direction, that is, in the forward direction. The facsimile machine 1 needs to drive the platen roller 10, the ribbon take-up spool 21, and the sheet discharge roller 17, in order to perform the recording operation. Therefore, the control unit controls the drive motor 57 to rotate the sun gear 43 in the forward direction such that the lower end of the rotation regulating member 51 in the regulating unit 49 engages the positioning hole 56B formed in the base plate 41. When the lower end of the rotation regulating member 51 engages in the positioning hole 56B in the base plate 41, the switch terminal 81 of the sensor switch 80 is located in the recess 60C formed in the rotating member 45, as shown in FIG. 10.

In the state that the rotation regulating member 51 is engaged in the positioning hole 56B, the drive force transmission path to the ribbon take-up spool 21 is formed, as described above, with the planetary gear 47, the second transmission gear 62, the driven gear 67, the driven gear 67A below the driven gear 67, and the driven gear 68. In addition, the drive force transmission path to the platen roller 10 is formed, as described above, with the planetary gear 47, the second transmission gear 62, the driven gears 67 and 69. Further, the drive force transmission path to the sheet discharge roller 17 is formed, as described above, with the planetary gear 47, the second transmission gear 62, the driven gear below the second transmission gear 62, and the driven gear 70.

When the control unit controls the drive motor 57 to rotate the sun gear 43 in the reverse direction in the state that the rotation regulating member 51 engages in the positioning hole 56B, the rotating member 45 does not follow the rotation of the sun gear 43 due to the action of the clutch spring 48, so that each of the planetary gears 46, 47 is not pivotally rotated, but rotates on its axis in association with the rotation of the sun gear 43. The platen roller 10 and the sheet discharge roller 17 are rotated by the drive force transmitted through the respective drive force transmission path to feed the recording sheet while the ribbon 20 is fed by the ribbon take-up spool 21 that is rotated by the drive force transmitted through the drive force transmission path to the spool 21. The image data received from another facsimile machine is recorded onto the recording sheet with the thermal head 11.

After the image data has been recorded, the control unit controls the drive motor 57 to rotate the sun gear 43 in the forward direction for the next sheet discharging operation. When the sun gear 43 is rotated in the forward direction, the frictional load between the sun gear 43 and the rotating member 45 is increased due to the action of the clutch spring 48. The facsimile machine 1 needs to drive the sheet discharge roller 17, in order to perform the sheet discharging operation.

The control unit controls the drive motor 57 to rotate the sun gear 43 in the forward direction such that the lower end of the rotation regulating member 51 in the regulating unit 49 is engaged in the positioning hole 56D formed in the base plate 41. When the lower end of the rotation regulating member 51 engages in the positioning hole 56D in the base plate 41, the switch terminal 81 of the sensor switch 80 is located in the recess 60E formed in the rotating member 45, as shown in FIG. 12. In the state that the rotation regulating member 51 is engaged in the positioning hole 56D, the drive force transmission path to the sheet discharge roller 17 is formed, as described above, with the planetary gear 46, the third transmission gear 63, and the driven gear 70.

At this time, the planetary gear 47 rotates on its axis without engaging any transmission gears 61 through 64. As described above, the driven gear 70 and the driven gear disposed below the second transmission gear 62 are engaged with each other. However, due to the action of the clutch spring (not shown) provided between the second transmission gear 62 and the driven gear disposed below the gear 62, the second transmission gear 62 and the driven gear below the gear 62 are disconnected. Therefore, the rotation of the driven gear 70 is not transmitted to the second transmission gear 62.

When the control unit controls the drive motor 57 to rotate the sun gear 43 in the reverse direction in the state that the rotation regulating member 51 is engaged in the positioning hole 56D, the rotating member 45 does not follow the rotation of the sun gear 43 due to the action of the clutch spring 48, so that each of the planetary gears 46, 47 is not pivotally rotated, but rotates on its axis in association with the rotation of the sun gear 43. The sheet discharge roller 17 is rotated by the drive force transmitted through the drive force transmission path to the roller 17, and the recording sheet is discharged from the facsimile machine 1 after the recording is finished.

To execute operations in the copying mode of the facsimile machine 1, the facsimile machine 1 first needs to drive the LF roller 32 and the document discharge roller 36 to feed a document. The control unit controls the drive motor 57 to rotate the sun gear 43 in the forward direction such that the lower end of the rotation regulating member 51 in the regulating unit 49 is engaged in the positioning hole 56E formed in the base plate 41. When the lower end of the rotation regulating member 51 engages in the positioning hole 56E in the base plate 41, the switch terminal 81 of the sensor switch 80 is located in the recess 60A in the rotating member 45, as shown in FIG. 13.

When the rotation regulating member 51 engages the positioning hole 56E, the drive force transmission path to the document discharge roller 36 is formed, as described above, with the planetary gear 46, the forth transmission gear 64, the driven gear 71 and the driven gear below the driven gear 71, and the driven gear 73. At the same time, the drive force transmission path to the LF roller 32 is formed with the planetary gear 46, the fourth transmission 64, the driven gear 71, the driven gear below the driven gear 71 and the driven gears 72, 74. When the facsimile machine 1 is in a standby condition, the gear changing device 40 is placed in a condition such as shown in FIG. 13, where the planetary gear 46 and the fourth transmission 64 are securely engaged with each other to prevent a rattle therebetween due to the vibrations that may be caused while the facsimile machine 1 is in the standby condition.

When the control unit controls the drive motor 57 to rotate the sun gear 43 in the reverse direction in the state that the rotation regulating member 51 engages the positioning hole 56E, the rotating member 45 does not follow the rotation of the sun gear 43 due to the action of the clutch spring 48, so that each of the planetary gears 46, 47 are not pivotally rotated, but rotate on their axis in association with the rotation of the sun gear 43. The LF roller 32 and the document discharge roller 36 are rotated by the drive force transmitted through the respective drive force transmission paths, so as to feed a document along the document feeding path R2 (in FIG. 1) to a predetermined position (where an image on the document begins to be read).

Thereafter, the control unit controls the drive motor 57 to rotate the sun gear 43 in the forward direction for the next sheet feeding operation. When the sun gear 43 is rotated in the forward direction, the frictional load between the sun gear 43 and the rotating member 45 is increased due to action of the clutch spring 48. Therefore, the rotating member 45 rotates following the sun gear 43 in the same forward direction. The facsimile machine 1 needs to drive the sheet pick-up roller 5 to perform the sheet feeding operation. Therefore, the control unit controls the drive motor 57 to rotate the sun gear 43 in the forward direction such that the lower end of the rotation regulating member 51 in the regulating unit 49 is engaged in the positioning hole 56A formed in the base plate 41.

When the lower end of the rotation regulating member 51 engages the positioning hole 56A in the base plate 41, the switch terminal 81 of the sensor switch 80 is located in the recess 60B formed in the rotating member 45, as shown in FIG. 9. In the state that the rotation regulating member 51 is engaged in the positioning hole 56A, the drive force transmission path to the sheet pick-up roller 5 is formed, as described above, with the planetary gear 47, the first transmission gear 61, and the driven gears 65, 66.

When the control unit controls the drive motor 57 to rotate the sun gear 43 in the reverse direction in the state that the rotation regulating member 51 engages in the positioning hole 56A, the rotating member 45 does not follow the rotation of the sun gear 43 due to the action of the clutch spring 48, so that each of the planetary gears 46, 47 are not pivotally rotated, but rotate on their axis in association with the rotation of the sun gear 43. The sheet pick-up roller 5 is rotated by the drive force transmitted through the drive force transmission path to the roller 5 and the recording sheet is fed from the sheet stacker 4. Thereafter, the control unit controls the drive motor 57 to rotate the sun gear 43 in the forward direction for the next copying operation.

When the sun gear 43 is rotated in the forward direction, the frictional load between the sun gear 43 and the rotating member 45 is increased due to the action of the clutch spring 48. Therefore, the rotating member 45 is rotated together with the sun gear 43, in the same direction as the sun gear 43. The facsimile machine 1 needs to drive the LF roller 32, the document discharge roller 36, the sheet discharge roller 17, the platen roller 10, and the ribbon take-up spool 21, for the copying operation. Therefore, the control unit controls the drive motor 57 to rotate the sun gear 43 in the forward direction such that the lower end of the rotation regulating member 51 in the regulating unit 49 contacts the positioning edge 56C of the base plate 41. When the lower end of the rotation regulating member 51 contacts the positioning edge 56C of the base plate 41, the switch terminal 81 of the sensor switch 80 is located in the recess 60D formed in the rotating member 45, as shown in FIG. 11.

In the state that the rotation regulating member 51 contacts the positioning edge 56C, the drive force transmission path to the document discharge roller 36 is formed, as described above, with the planetary gear 47, the forth transmission gear 64, the driven gear 71, the driven gear below the driven gear 71, and the driven gear 73. At the same time, the drive force transmission path to the LF roller 32 is formed, as described above, with the planetary gear 47, the fourth transmission 64, the driven gear 71, the driven gear below the driven gear 71, and the driven gears 72, 74.

In addition, because the planetary gear 46 is engaged with the second transmission gear 62, the drive force transmission path to the platen roller 10 is formed, as described above, with the planetary gear 46, the second transmission gear 62, and the driven gears 67, 69. Further, the drive force transmission path to the sheet discharge roller 17 is formed, as described above, with the planetary gear 46, the second transmission gear 62, the driven gear below the second transmission gear 62, and the driven gear 70. The drive force transmission path to the ribbon take-up spool 21 is formed, as described above, with the planetary gear 46, the second transmission gear 62, the driven gear 67, the driven gear 67A disposed below the driven gear 67, and the driven gear 68.

When the control unit controls the drive motor 57 to rotate the sun gear 43 in the reverse direction in the state that the rotation regulating member 51 contacts the positioning edge 56C, the rotating member 45 does not follow the rotation of the sun gear 43 due to the action of the clutch spring 48, so that each of the planetary gears 46, 47 is not pivotally rotated, but rotate on their axis in association with the rotation of the sun gear 43. The LF roller 32 and the document discharge roller 36 are rotated by the drive force transmitted through the respective drive force transmission paths, so as to feed the document. An image on the document is read with the CIS unit 34.

At the same time, the drive force transmission path to the ribbon take-up spool 21 from the driven gear 68, and the drive force transmission path to the platen roller 10 from the driven gear 69, as well as the drive force transmission path to the sheet discharge roller 17 from the driven gear 70 are formed to feed the recording sheet along the sheet feeding path R1, while the ribbon 20 is being fed. The image data read by the CIS unit 34 from the document is recorded onto the recording sheet by the thermal head 11.

After recording the image data read from the document onto the recording sheet, the control unit controls the drive motor 57 to rotate the sun gear 43 in the forward direction for the next sheet discharging operation. When the sun gear 43 is rotated in the forward direction, the sun gear 43 and the rotating member 45 are connected by the action of the clutch spring 48, so that the rotating member 45 is rotated in the same direction as the sun gear 43, following the rotation of the sun gear 43. The facsimile machine 1 needs to drive the sheet discharge roller 17, in order to perform the sheet discharging operation. Therefore, the control unit controls the drive motor 57 to rotate the sun gear 43 in the forward direction such that the lower end of the rotation regulating member 51 in the regulating unit 49 engages the positioning hole 56D formed in the base plate 41. When the lower end of the rotation regulating member 51 engages the positioning hole 56D in the base plate 41, the switch terminal 81 of the sensor switch 80 is located in the recess 60E in the rotating member 45, as shown in FIG. 12. In the state that the rotation regulating member 51 engages the positioning hole 56D, the drive force transmission path to the sheet discharge roller 17 is formed, as described above, with the planetary gear 46, the third transmission gear 63, and the driven gear 70. At this time, the planetary gear 47 rotates on its axis without engaging any transmission gears 61 through 64.

As described above, the driven gear 70 and the driven gear disposed below the second transmission gear 62 are engaged with each other. However, due to the action of the clutch spring (not shown) provided between the second transmission gear 62 and the driven gear disposed below the gear 62, the second transmission gear 62 and the driven gear below the gear 62 are disconnected. Therefore, the rotation of the driven gear 70 is not transmitted to the second transmission gear 62. When the sheet discharge roller 17 is rotated by the drive force transmitted through the drive force transmission path to the roller 17, the second transmission gear 62 is not rotated. Therefore, the drive force transmission path formed with the second transmission gear 62 and the driven gears 67, 68 is disconnected and consequently, the ribbon take-up spool 21 is not driven. Because the ribbon 20 is not fed while the recording sheet is discharged, the ribbon 20 is not wasted.

When the control unit controls the drive motor 57 to rotate the sun gear 43 in the reverse direction in the state that the rotation regulating member 51 engages the positioning hole 56D, the rotating member 45 does not follow the rotation of the sun gear 43 due to the action of the clutch spring 48. Accordingly, each of the planetary gears 46, 47 are not pivotally rotated, but rotate on their axis in association with the rotation of the sun gear 43. The sheet discharge roller 17 is rotated by the drive force transmitted through the drive force transmission path to the roller 17 and the recording sheet is discharged from the facsimile machine 1 by the sheet discharge roller 17 after recording is finished.

Briefly stated, the gear changing device 40 is placed in the condition as shown in FIG. 8, in the transmission mode. In the reception mode, the gear changing device 40 is placed in the condition as shown in FIGS. 9, 10, and 12 in the identified order. In the copying mode, the gear changing device 40 is placed in the condition as shown in FIGS. 13, 9, 10, 11, 10, 12 and 13 in the identified order. The signals outputted from the sensor switch 80 and detected by the CPU 101 are used to switch the conditions of the gear changing device 40 at an appropriate timing. The CPU 101 of the control unit performs controls based on the detected ON/OFF signals (based on the ON/OFF conditions of the sensor switch 80). With reference to FIGS. 14 through 19, the controls performed by the CPU 101 are described below.

Figure 14:
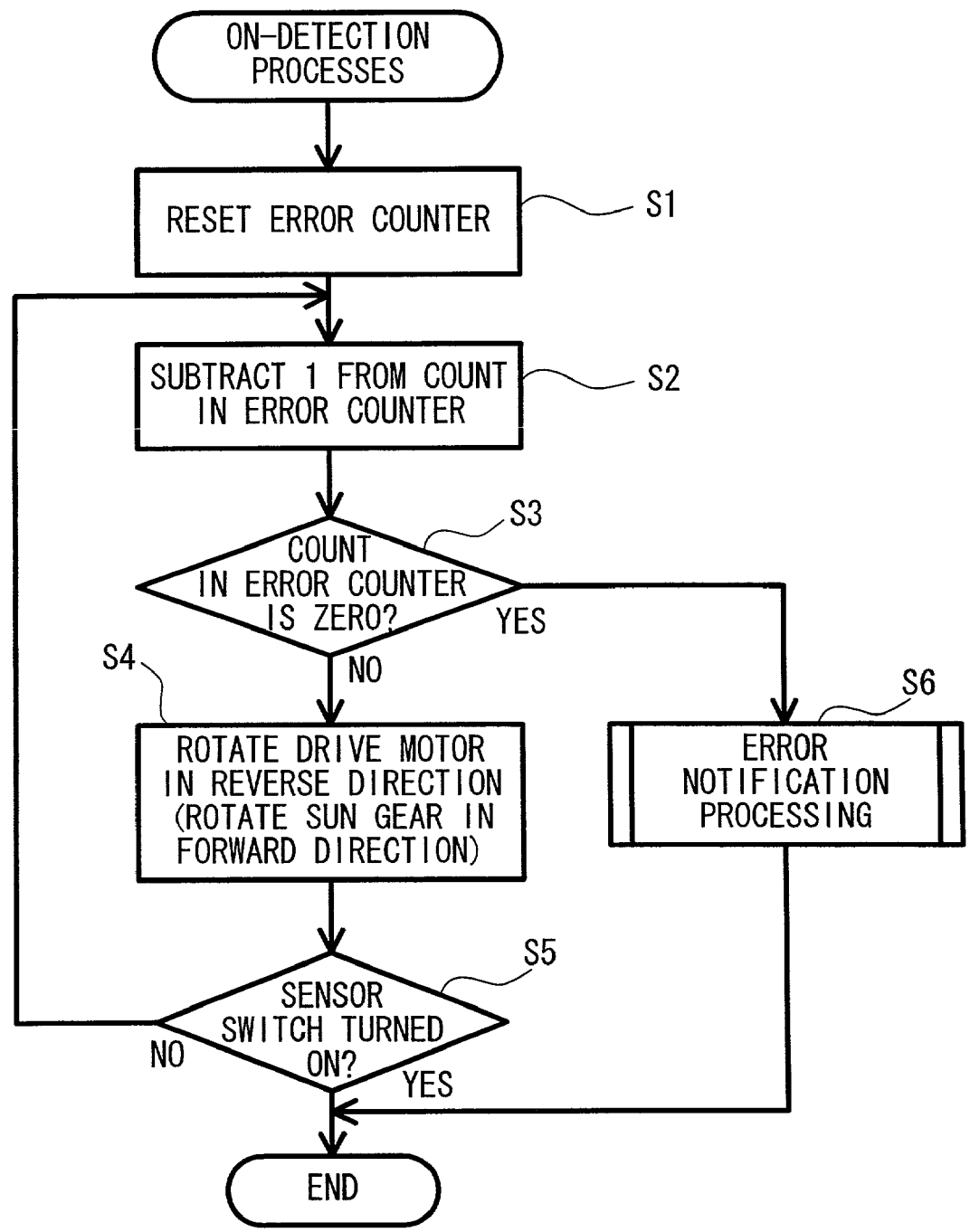
Figure 15:
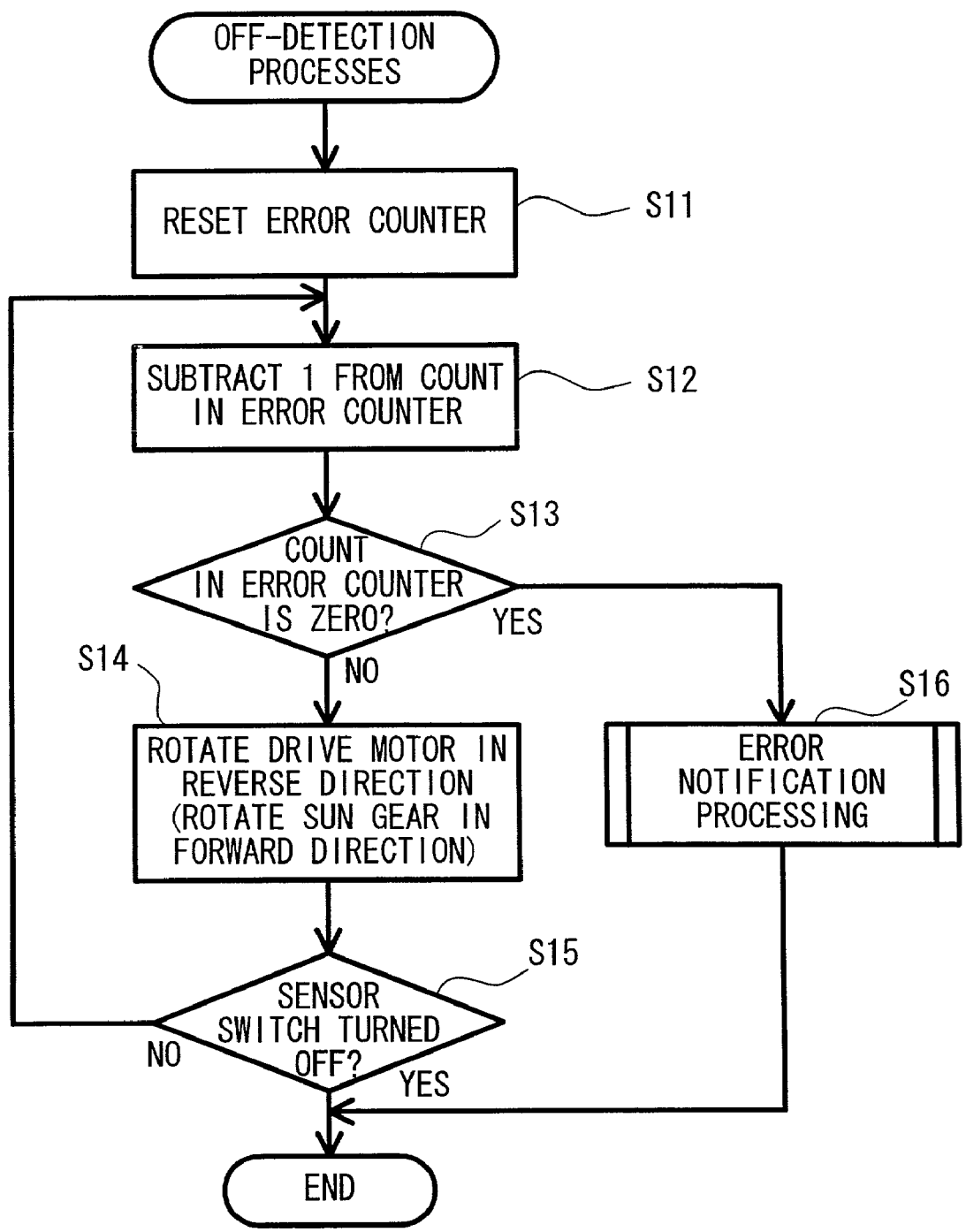
FIG. 15 is a flowchart showing OFF-detection processes to detect when the sensor switch is turned off.
Figure 16:
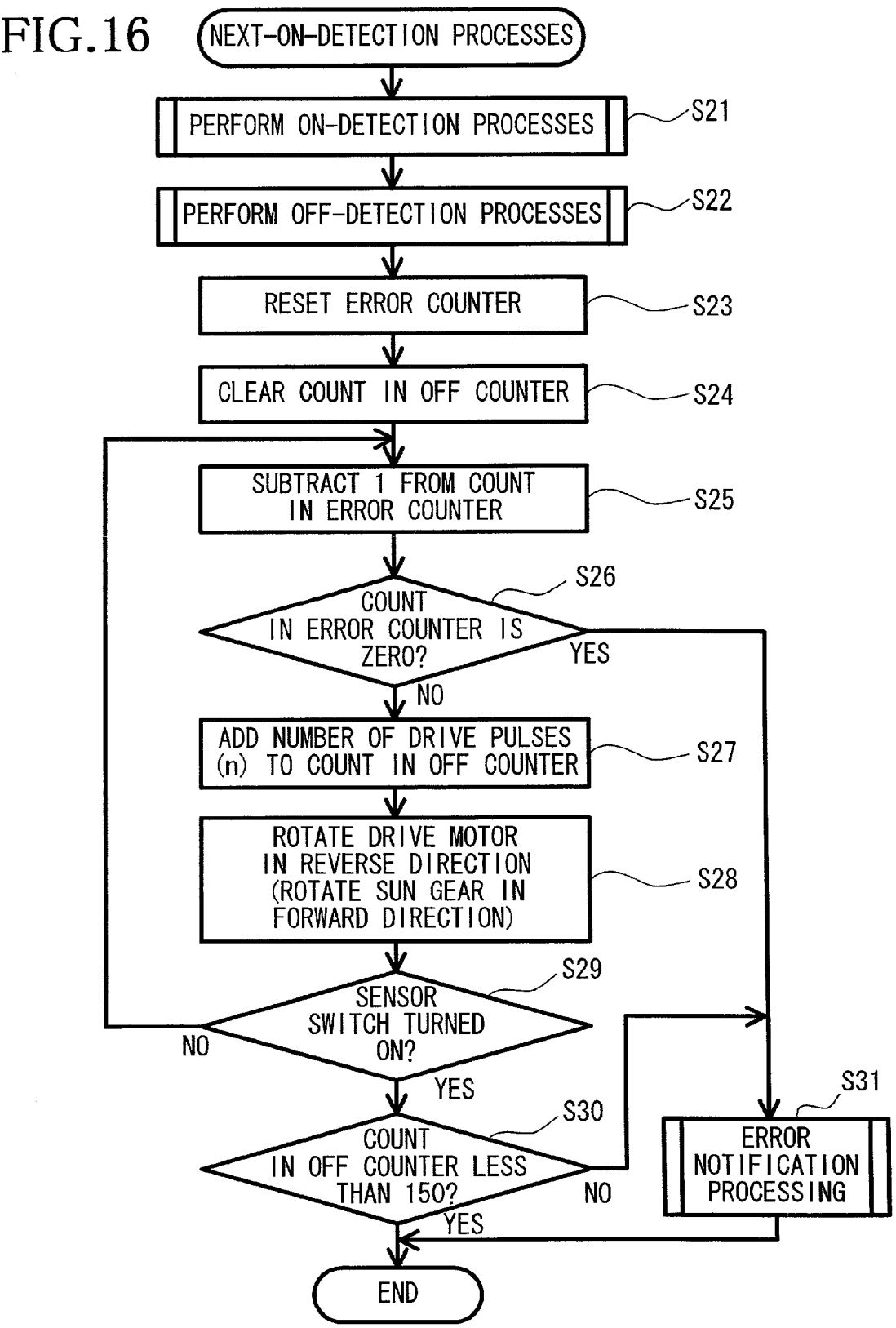
FIG. 16 is a flowchart showing next-ON-detection processes to detect a next ON condition of the sensor switch after the sensor switch is turned on, and then turned off.
Figure 17:
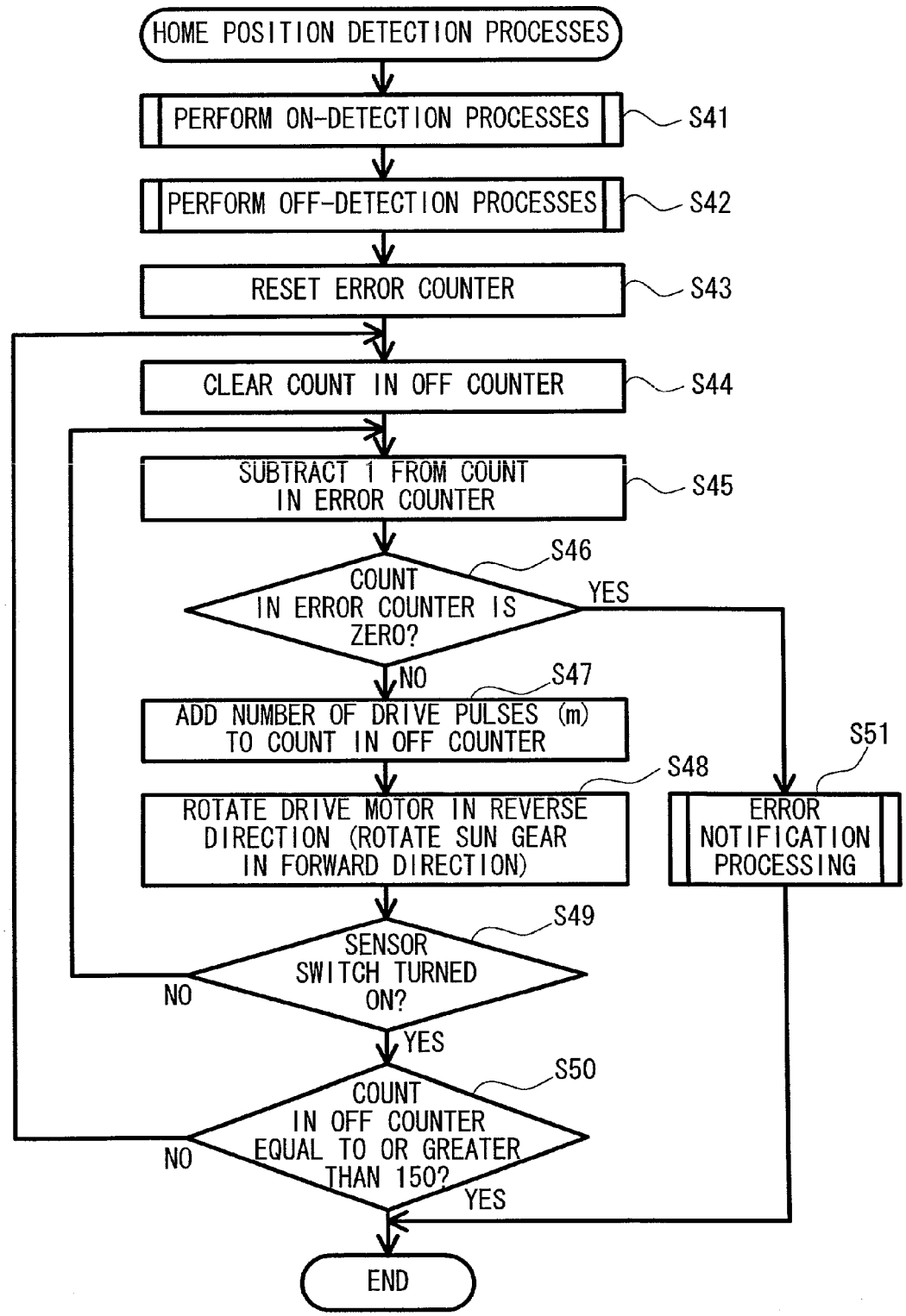
FIG. 17 is a flowchart showing home position detection processes to be performed until the rotating member is brought in a home position.
Figure 19:
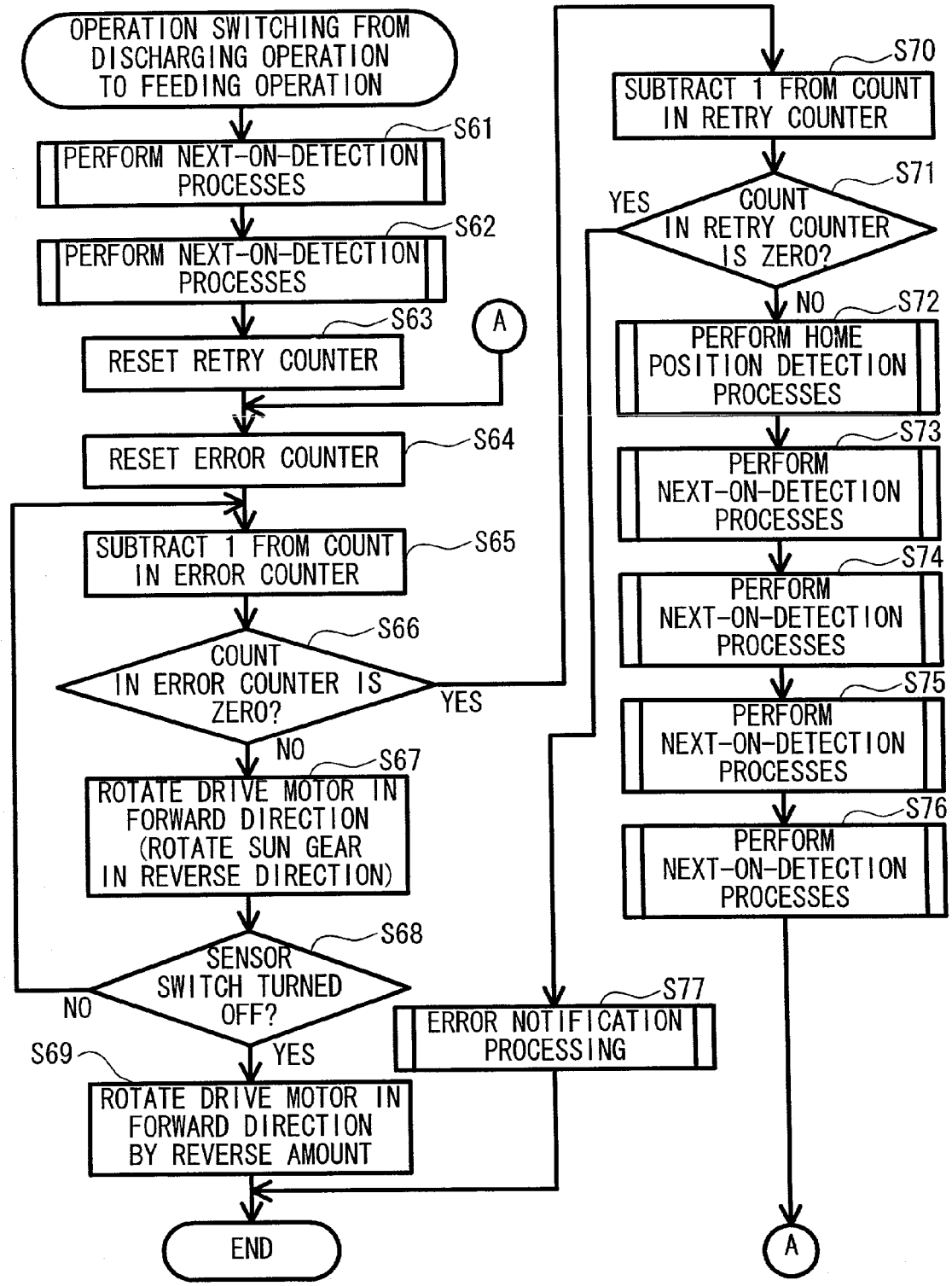
FIG. 19 is a flowchart showing an operation switching from a sheet discharging operation to a sheet feeding operation.

FIG. 14 is a flowchart showing ON-detection processes to detect whether the sensor switch 80 is turned on. FIG. 15 is a flowchart showing OFF-detection processes to detect whether the sensor switch 80 is turned off. FIG. 16 is a flowchart showing next-ON-detection processes to detect a next ON condition of the sensor switch 80 after the sensor switch 80 is turned on, and then turned off. FIG. 17 is a flowchart showing a home position detection processes to be performed until the rotating member 45 is brought in a home position. FIG. 18 shows a table to be referred to when an operation is switched to another operation. FIG. 19 is a flowchart showing an operation switching from a sheet discharging operation to a sheet feeding operation.

When the rotating member 45 is in a home position, the switch terminal 81 of the sensor switch 80 is positioned in the recess 60C, whose distance or width is the longest among the recesses 60A, 60B, 60C, 60D, 60E. The ON and OFF-detection processes shown in FIGS. 14 and 15, respectively, are basic subroutines performed by the CPU 101. The next-ON-detection processes and home position detection processes shown in FIGS. 16 and 17, respectively, are versatile subroutines including the ON and OFF-detection processes.

When the CPU 101 of the control unit performs controls, a register 101A in the CPU 101 is used as an error counter for repeatedly performing a loop by a predetermined number of times until the CPU 101 determines that an operational error occurs, an OFF counter for counting the number of drive pulses applied to the drive motor 57 when the sensor switch 80 is turned off, and a retry counter for performing a retry by a predetermined number of times even after the operational error has been detected.

Referring to FIG. 14, the ON-detection processes to detect whether the sensor switch 80 is turned on will be described in detail below. When the ON-detection processes are started, the CPU 101 starts to reset the error counter (S1). At this time, a predetermined number of times that a certain loop is performed until the CPU 101 determines that an error occurs, is set in the error counter. The number of times to be set in the error counter is, for example, 3 or 5.

Thereafter, the CPU 101 subtracts one (1) from the count in the error counter (S2). Immediately after step S2, the CPU 101 determines whether the count in the error counter is zero (S3). When the count in the error counter is not zero (S3: NO), the CPU 101 applies the drive pulses to the drive motor 57 to rotate the drive motor 57 in the reverse direction. As the drive motor 57 rotates in the reverse direction, the sun gear 43 rotates in the forward direction.

After the sun gear 43 is thus rotated in the forward direction, the CPU 101 monitors whether the sensor switch 80 is turned on (S5). When the CPU 101 detects that sensor switch 80 is turned on (S5: YES), the CPU 101 ends the ON-detection processes. In the ON-detection processes, the CPU 101 recognizes a moment at which the switch terminal 81 of the sensor switch 80 comes in contact with a left side surface of the projection 60A', 60B', 60C', 60D', 60E' of the rotating member 45. When the CPU 101 detects that the sensor switch 80 is not turned on (S5: NO), the CPU 101 returns to step S2. Steps S2 to S5 are performed as a loop.

When the count in the error counter is zero (S3: YES), the CPU 101 stops the drive motor 57 and then performs an error notification processing step (S6) to notify a user of an error, for example, by indicating in the display unit 115 or issuing a sound from the speaker 113A. Then, the CPU 101 ends the ON-detection processes. The error includes a condition such that the rotating member 45 does not rotate even after a considerable period of time has passed since the sun gear 43 is rotated in the forward direction.

Referring to FIG. 15, the OFF-detection processes to detect whether the sensor switch 80 is turned off will be described in detail below. When the OFF-detection processes are started, the CPU 101 starts to reset the error counter (S11). At this time, a predetermined number of times that a certain loop is performed until the CPU 101 determines that an error occurs, is set in the error counter. The number of times to be set in the error counter is, for example, 3 or 5. Thereafter, the CPU 101 subtracts one (1) from the count in the error counter (S12). Immediately after step S12, the CPU 101 determines whether the count in the error counter is zero (S13).

When the count in the error counter is not zero (S13: NO), the CPU 101 applies the drive pulses to the drive motor 57 to rotate the drive motor 57 in the reverse direction. As the drive motor 57 rotates in the reverse direction, the sun gear 43 rotates in the forward direction. After the sun gear 43 is thus rotated in the forward direction, the CPU 101 monitors, until the sensor switch 80 is turned off, a signal from the sensor switch 80 (S15).

When the CPU 101 detects that sensor switch 80 is turned off (S15: YES), the CPU 101 ends the OFF-detection processes. In the OFF-detection processes, the CPU 101 recognizes a condition where the switch terminal 81 of the sensor switch 80 positions in the recess 60A, 60B, 60C, 60D, 60E of the rotating member 45 after being out of contact with the projection 60A', 60B', 60C', 60D', 60E', away from a right side surface thereof. When the CPU 101 detects that the sensor switch 80 is not turned off (S15: NO), the CPU 101 returns to step S12. Steps S12 to S15 are performed as a loop.

When the count in the error counter is zero (S13: YES), the CPU 101 stops the drive motor 57 and then performs the error notification processing (S16) to notify a user of an error, for example, by indicating in the display unit 115 or issuing a sound from the speaker 113A. Then, the CPU 101 ends the OFF-detection processes. The error includes a condition where the rotating member 45 does not rotate even after a considerable period of time has passed since the sun gear 43 is rotated in the forward direction because the switch terminal 81 is trapped by the projection 60A', 60B', 60C', 60D', 60E'.

Referring to FIG. 16, the next-ON-detection processes to detect, after the sensor switch 80 is turned on and then off, where the sensor switch 80 is again turned on, will be described in detail below. When the next-ON-detection processes are started, the CPU 101 first performs the ON-detection processes (S21) and then, the OFF-detection processes (S22), as described above. More specifically, the CPU 101 detects that the switch terminal 81 of the sensor switch 80 makes contact with any one of the projections 60A', 60B', 60C', 60D', 60E' at the left side surface thereof and then moves away from the right side surface thereof, being positioned in any one of the adjacent recesses 60A, 60B, 60C, 60D, 60E. Thus, the CPU 101 recognizes a moment at which the switch terminal 81 moves out of contact with the rotating member 45.

At the time when the CPU 101 recognizes such a moment, the CPU 101 resets the error counter (S23). A predetermined number of times that a certain loop is performed until the CPU 101 determines that an error occurs, is set in the error counter. The number of times to be set in the error counter is, for example, 3 or 5. The CPU 101 also clears the count in the OFF counter to zero (S24). Thereafter, the CPU 101 subtracts one (1) from the count in the error counter (S25). Immediately after step S25, the CPU 101 determines whether the count in the error counter is zero (S26).

When the count in the error counter is not zero (S26: NO), the CPU 101 adds up the number of drive pulses (n) applied to drive motor 57 immediately after the CPU 101 detects the OFF-detection processes in step 22 that the sensor switch 80 is turned off. The CPU 101 adds the number of the drive pulses (n), to the count in the OFF counter (S27).

Subsequently, the CPU 101 applies the drive pulses to the drive motor 57 to rotate the motor 57 in the reverse direction (S28). As described above, when the drive motor 57 rotates in the reverse direction, the sun gear 43 is rotated in the forward direction. After the sun gear 43 is rotated in the forward direction, the CPU 101 monitors, until the sensor switch 80 is turned on, a signal from the sensor switch 80 (S29).

When the CPU 101 detects that the sensor switch 80 is turned on (S29: YES), the CPU 101 determines whether the count in the OFF counter is less than, for example, 150 (S30). The count "150" in the OFF counter is given as an example of a threshold value that is predetermined to discriminate between the conditions where the switch terminal 81 is in the home position of the widest recess 60C and the switch terminal 81 is in a position other than the home position or the recess 60A, 60B, 60D, or 60E. More specifically, the rotating member 45 according to the exemplary embodiment is designed such that at least 150 drive pulses need to be applied to the drive motor 57 to rotate the sun gear 43 in the forward direction to position the switch terminal 81 out of the widest recess 60C. The threshold value of 150 is only an example, an appropriate threshold value may be selected in accordance with the widest recess among a plurality of recesses.

When the count in the OFF counter immediately after the sensor switch 80 is turned on, is less than 150 (S30: YES), the CPU 101 ends the next-ON-detection processes. In the next-ON-detection processes, after the switch terminal 81 of the switch sensor 80 contacts the left side surface of the projection 60A', 60B', 60D', 60E' and is then positioned in the recess 60A, 60B, 60D, 60E other than the home position of the recess 60C, the CPU 101 recognizes a moment at which the switch terminal 81 contacts the left side surface of the adjacent projection 60B', 60C', 60E', 60A'. In other words, when a series of the next-ON-detection processes is performed once, the switch terminal 81 moves beyond one projection 60A', 60B', 60D', 60E', such that the recess 60A, 60B, 60D, 60E is positioned opposite the switch terminal 81.

When the count in the OFF counter immediately after the sensor switch 80 is turned on, is equal to or greater than 150 (S30: NO), the CPU 101 stops the drive motor 57 and then performs the error notification processing (S31) to notify a user of an error. This may be done, for example, by indicating in the display unit 115 or issuing a sound from the speaker 113A, whereupon the next-ON-detection processes end. The error during this routine of the next-ON-detection processes includes a condition that the rotating member 45 is in the home position, that is the switch terminal 81 is in the recess 60C. When the CPU 101 detects that the sensor switch 80 is not turned on (S29: NO), the CPU 101 returns to step S25. Steps S25 to S29 are performed as a loop in extremely short cycles.

When the count in the error counter is zero (S26: YES), the CPU 101 stops the drive motor 57 and flow proceeds to step S31 where error notification processing is performed to notify a user of an error, for example, by indicating in the display unit 115 or issuing a sound from the speaker 113A, whereupon the next-ON-detection processes end. The error includes a condition where the rotating member 45 does not rotate even after a considerable period of time has passed since the sun gear 43 is rotated in the forward direction.

Referring to FIG. 17, the home position detection processes will be described in detail below. When the home position detection processes are started, the CPU 101 first performs the ON-detection processes (S41) and then, the OFF-detection processes (S42) in a similar manner as performed in the next-ON-detection processes. Then, the CPU 101 resets the error counter (S43). At this time, a predetermined number of times that a certain loop is performed until the CPU 101 determines that an error occurs, is set in the error counter. The number of times to be set in the error counter is, for example, 3 or 5. The CPU 101 also clears the count in the OFF counter to zero (S44). Thereafter, the CPU 101 subtracts one (1) from the count in the error counter (S45). Immediately after step S45, the CPU 101 determines whether the count in the error counter is zero (S46).

When the count in the error counter is not zero (S46: NO), the CPU 101 adds up the number of the drive pulses (m) applied to the drive motor 57 immediately after the CPU 101 detects in the OFF-detection processes in step 42 that the sensor switch 80 is turned off. The CPU 101 adds the number of the drive pulses (m) to the count in the OFF counter (S47). Subsequently, the CPU 101 applies the drive pulses to the drive motor 57 to rotate the motor 57 in the reverse direction (S48). As described above, when the drive motor 57 rotates in the reverse direction, the sun gear 43 is rotated in the forward direction.

After the sun gear 43 is rotated in the forward direction, the CPU 101 monitors, until the sensor switch 80 is turned on, a signal from the sensor switch 80 (S49). When the CPU 101 detects that the sensor switch 80 is turned on (S49: YES), the CPU 101 determines whether the count in the OFF counter is equal to or greater than, for example, 150 (S50). The count "150" in the OFF counter is given as an example of a threshold value predetermined as described above.

When the count in the OFF counter immediately after the sensor switch 80 is turned on, is equal to or greater than 150 (S50: YES), the CPU 101 ends the home position detection processes. In the home position detection processes, after the switch terminal 81 of the sensor switch 80 contacts the projection 60C' and is positioned in the recess 60C, the CPU 101 recognizes a moment at which the switch terminal 81 comes in contact with the left side surface of the projection 60D' adjacent to the recess 60C of the home position. At the time when the home position detection processes are finished, the switch terminal 81 of the sensor switch 80 is left in contact with the left side surface of the projection 60D'. When the count in the OFF counter immediately after the sensor switch 80 is turned on, is not equal to or greater than 150 (S50: NO), the CPU 101 returns to step S44. Steps S44 to S50 are performed as a loop. When the CPU 101 detects that the sensor switch 80 is not turned on (S49: NO), the CPU 101 returns to step S45. Steps S45 to S49 are performed as a loop.

When the count in the error counter is zero (S46: YES), the CPU 101 stops the drive motor 57 and then performs the error notification processing (S51) to notify a user of an error, for example, by indicating an error in the display unit 115 or issuing a sound from the speaker 113A, whereupon the home position detection processes end. The error includes a condition where the rotating member 45 does not rotate even after a considerable period of time has passed since the sun gear 43 is rotated in the forward direction.

A main routine including the subroutines of the above-described ON-detection processes, OFF-detection processes, next-ON-detection processes, and home position detection processes is specified in a table such as shown in FIG. 18, for making switches between operations. Referring to FIG. 18, the operation switching to be made based on the table will be described below.

The operations before switching are assigned to rows of the table. The operations after switching are assigned to columns of the table. An intersection of a row and a column specifies a subroutine to be performed when the operation specified in the row is switched to the operation specified in the column. For example, when the standby state specified in the second row is switched to the image reading operation specified in the first column, the ON-detection processes (which are represented by "TO ON") is first performed. Thereafter, as an amount that the drive motor 57 is reversed in the forward direction, 20 drive pulses are applied to the drive motor 57 to rotate the sun gear 43 in the reverse direction (which is represented by "REVERSE AMOUNT=20" in FIG. 18). To make a switch from the sheet feeding operation in the third row to the image reading operation in the first column, the home position detection processes (which are represented by "HP" in FIG. 18) are performed, as well as the next-ON-detection processes (which are represented by "NEXT ON") three times. Thereafter, 20 drive pulses are applied, as an amount that the drive motor 57 is reversed in the forward direction, to the drive motor 57 to rotate the sun gear 43 in the reverse direction.

None of the rows or columns of the table specify the OFF-detection processes. However, the OFF-detection processes are substantially performed as a subroutine for the home position detection processes and the next-ON-detection processes. The number of times that the next-ON-detection processes are performed from the home position is predetermined for each operation specified in columns, though it is not represented in FIG. 18. For example, in the sheet feeding operation, as shown in FIG. 9, the switch terminal 81 is located in the fourth recess 60B from the home position of the recess 60C when the rotating member 45 rotates in the forward direction. To place the switch terminal 81 in the recess 60B, the next-ON-detection processes are to be performed four times after the home position detection processes are performed.

The flow of the operation switching to be made based on the table shown in FIG. 18, for example, from the sheet discharging operation to the sheet feeding operation will be described below, with reference to FIG. 19. When switching is made from the sheet discharging operation to the sheet feeding operation, the CPU 101 refers to the table shown in FIG. 18, performing the next-ON-detection processes twice (S61, S62). More specifically, as shown in FIG. 12, the switch terminal 81 is located in the recess 60E in the sheet discharging operation. In this state, the next-ON-detection processes are performed twice. Accordingly, the switch terminal 81 comes to be located in the recess 60B, which is the second recess from the recess 60E in the forward direction, and starts to contact the projection 60C'. In the next-ON-detection processes performed in steps S61 and S62, the error notification processing is not performed.

Thereafter, the CPU 101 resets the retry counter (S63). At this time, the number of times that a retry is performed before the CPU 101 determines that an error occurs is set in the retry counter. The number of times to be set in the retry counter is, for example, 2. The CPU 101 resets the error counter (S64). At this time, a predetermined number of times that a certain loop is performed until the CPU 101 determines that an error occurs, is set in the error counter. The number of times to be set in the error counter is, for example, 3 or 5. Thereafter, the CPU 101 subtracts one (1) from the count in the error counter (S65). Immediately after step S65, the CPU 101 determines whether the count in the error counter is zero (S66). When the count in the error counter is not zero (S66: NO), the CPU 101 applies the drive pulses to the drive motor 57 to rotate the motor 57 in the forward direction (S67). At this time, the rotating direction of the drive motor 57 is changed from the reverse direction to the forward direction. According to the rotation of the drive motor 57 in the forward direction, the sun gear 43 is rotated in the reverse direction.

Immediately after the sun gear 43 is rotated in the reverse direction, the CPU 101 determines, based on the signal from the sensor switch 80, that the sensor switch 80 is turned off (S68). This determination is made to recognize that the switch terminal 81 is in the recess 60B away from the left side of the projection 60C'.

When the CPU 101 detects that the sensor switch 80 is turned off (S68: YES), the CPU 101 recognizes that the switch terminal 81 is located in the recess 60B and applies to the drive motor 57 the drive pulses specified in the table shown in FIG. 18 as the reverse amount (50 drive pulses in this case), to rotate the sun gear 43 further in the reverse direction (S69). Thereafter, the switching from the sheet discharge operation to the sheet feeding operation is finished. More specifically, after it is made sure that the switch terminal 81 is in the recess 60B, the drive pulses are applied to the drive motor 57 to slightly rotate the rotating member 45 in the reverse direction in association with the rotation of the sun gear 43 in the reverse direction, thereby enabling the rotating member 45 to be stopped securely by the regulating unit 49.

As the sun gear 43 is rotated in the reverse direction in the state that the rotating member 45 is stopped securely by the regulating unit 49, the drive force transmission path to the sheet pick-up roller 5 is reliably formed, as described above, with the planetary gear 47, the first transmission gear 61, and the driven gears 65, 66. The sheet pick-up roller 5 is rotated by the drive force transmitted through the thus formed drive force transmission path, and the recording sheet is fed from the sheet stacker 4.

When the CPU 101 detects that the sensor switch 80 is not turned off (S68: NO), the CPU 101 returns to step S65. Steps S65 to S68 are performed as a loop in extremely short cycles. One possible reason that OFF condition of the sensor switch 80 is not detected is that the switch terminal 81 is trapped by the projection 60C' and the sensor switch 80 is turned on, so that the rotating member 45 is prevented from slightly rotating in the reverse direction. In this embodiment, even if such an error occurs, the error can be avoided with retry processes, which will be described below in more detail.

When the count in the error counter is zero(S66: YES), the CPU 101 subtracts one (1) from the count in the retry counter, as a first step of the retry processes (S70), without performing the error notification processing. Immediately after step S70, the CPU 101 determines whether the count in the retry counter is zero (S71).

When the counter count in the retry counter is not zero (S71: NO), the CPU 101 performs the home position detection processes (S72), and the next-ON-detection processes four times (S73 to S76), so as to clear the error condition and bring the error condition into a condition where the sheet feeding can be performed by locating the switch terminal 81 in the recess 60B. Thereafter, flow returns to step S64. The steps 70 through S76 are performed as the retry processes. Through the home position detection processes and the next-ON-detection processes performed four times, the rotating member 45, which is deemed to be one factor of the error, is rotated once and put back in a condition similar to the condition immediately after step S62.

When the count in the retry counter is zero (S71: YES), the CPU 101 determines that an error occurs and performs the error notification processing (S77), whereupon switching from the sheet discharging operation to the sheet feeding operation is finished. Operation switching other than from the sheet discharging operation to the sheet feeding operation, is made based on the table in FIG. 18, by replacing steps 61, 62 with appropriate processes associated with an operation to be switched from another operation. Steps 72 through 76 of the retry processes are also replaced with the relevant processes.

In the facsimile machine 1 including the gear changing device 40, a timing when the sun gear 43 is rotated in the reverse direction or the forward direction can be controlled based on the width of each recess 60A to 60E and projection 60A' to 60E' formed in the circumference of the rotating member 45. Therefore, the rotating directions of the sun gear 43 can be changed at an appropriate timing. The planetary gear 43 can be securely engaged with the transmission gears 61 through 64 required for operation modes and the operation mode switching can be smoothly made.

While the invention has been described with reference to the exemplary embodiment, it is to be understood that the invention is not restricted to the particular forms shown in the foregoing exemplary embodiment. Various modifications and alterations can be made thereto without departing from the scope of the invention, as set forth in the appended claims.

For example, the gear changing device 40 may be included in apparatus that require gears to be changed according to a plurality of operation modes, regardless of the type of the operation mode. Although two planetary gears 46, 47 are provided in the above-described exemplary embodiment, the number of the planetary gears is not limited to two. One planetary gear or three or more planetary gears may be provided.

In the exemplary embodiment, when it is determined, based on the signal from the sensor switch 80, that the sensor switch 80 is turned off, operations associated with the operation modes are performed. However, operations associated with the operation modes may be performed when the sensor switch 80 is turned on.

As is apparent from the foregoing description, in a gear changing device of the invention, a timing at which the sun gear is rotated in the reverse direction or the forward direction may be controlled based on the widths of the recesses and projections formed on the circumference of the rotating member. Therefore, the rotating directions of the sun gear may be changed at an appropriate timing. The planetary gear may be engaged with the transmission gears relevant for operation modes, and the operation modes may be smoothly switched.

In addition, in a gear changing device of the invention, it may be recognized at a time when the recess is detected after the projection is detected or a time when the projection is detected after the recess is detected, that the planetary gear and the transmission gear associated with an operation mode can be engaged with each other. Further, in a gear changing device of the invention, after the operation mode is recognized, the sun gear may be rotated in the reverse direction, at a time such that the projection is again detected after the recess is detected, or a time such that the recess is again detected after the projection is detected. Further, in a gear changing device of the invention, even when an error occurs such that a recess/projection detection condition has not been changed after the sun gear starts to rotate in the reverse direction, the error may be avoided by rotating the rotating member once according to the rotation of the sun gear in the forward direction, and then by starting to rotate the sun gear again in the reverse direction. The gear changing device may be applied to apparatus, such as a facsimile machine, that have a plurality of different operation modes, for example, an image reading mode, a recording mode, and a copying mode.

In a communication apparatus of the invention, a timing at which the sun gear is rotated in the reverse direction or the forward direction may be controlled based on widths of the recesses and projections formed on the circumference of the rotating member. Therefore, the rotating directions of the sun gear may be changed at an appropriate timing. The planetary gear may be engaged with the transmission gears relevant for operation modes, and the operation modes may be smoothly switched.

In addition, in a communication apparatus of the invention, it may be recognized, at a time when the recess is detected after the projection is detected or at a time when the projection is detected after the recess is detected, that the planetary gear and the transmission gear associated with an operation mode can be engaged with each other. Further, in a communication apparatus of the invention, after the operation mode is recognized, the sun gear may be rotated in the reverse direction, at a time such that the projection is again detected after the recess is detected, or a time such that the recess is again detected after the projection is detected.

Further, in a communication apparatus of the invention, even when an error occurs such that a recess/projection detection condition has not been changed after the sun gear starts to rotate in the reverse direction, the error may be avoided by rotating the rotating member once according to the rotation of the sun gear in the forward direction, and then by starting to rotate the sun gear again in the reverse direction.

In a communication apparatus of the invention, when operations are executed in operation modes, such as a transmission mode, a reception mode, and a copying mode, a driven gear required for an operation associated with an operation mode may be selected by rotating the sun gear in one direction, and the selected driven gear may be engaged with the planetary gear. When the sun gear is rotated in an opposite direction, the planetary gear may be rotated on an axis thereof while engaging with the selected driven gear. The operations required for the operation modes, such as the transmission mode, reception mode, and copying mode, may be selectively performed by selecting the rotating directions of the sun gear based on the rotation of the drive motor in the forward direction or the reverse direction. Accordingly, the number of components to be used for a drive force transmission mechanism may be reduced, thereby simplifying the mechanism. Consequently, the communication apparatus including the drive force transmission mechanism with reduced cost may be achieved. Further, the physical size of the communication apparatus may be reduced.

In a communication apparatus of the invention, as the sun gear rotates in one direction, a frictional load applied between the sun gear and the rotating member may be increased by an action of a frictional load generating device disposed between the sun gear and the rotating member. Accordingly, the rotating member may be rotated along with the sun gear, so as to pivotally rotate the planetary gear. When the sun gear rotates in the other direction, the frictional load applied between the sun gear and the rotating member may be decreased by the action of the frictional load generating device. Therefore, the drive force from the drive motor may be effectively transmitted to the driven gear through the sun gear and the planetary gears, while positioning the rotating member with the rotation regulating member.

In a communication apparatus of the invention, a predetermined angle formed by a pair of arms of the rotating member may be set to such an angle that two positions on the path of the planetary gear that pivotally rotates are selectable. Therefore, when the planetary gear rotatably supported by each of the arms is pivotally rotated, a predetermined number, one or two of the driven gears may be selected from the plurality of the driven gears in association with each operation mode, and the selected driven gear may be engaged with the planetary gear.

In a communication apparatus of the invention, the copying mode requires a document feeding operation, a sheet feeding operation, a sheet conveying operation, and a sheet discharging operation. Each planetary gear selectively engages with one of the driven gears, so that at least two operations may be performed simultaneously. Therefore, a smooth copying operation may be performed.

In a communication apparatus of the invention, the driven gears required for the sheet feeding operation, the recording operation with a recording head, and the sheet discharging operation to be performed in the reception mode and the copying mode, may be consecutively disposed along the path of the planetary gears that pivotally rotate. Therefore, the distance that the planetary gear moves while pivotally rotating may be reduced when the above-described sheet feeding operation, recording operation, and sheet discharging operations are sequentially performed. Thus, such operations required in the reception and copying modes may be smoothly performed.

In a communication apparatus of the invention, when a driven gear required for the sheet feeding operation or the sheet discharging operation is selected from the driven gears, the selected driven gear and a gear to be used for ribbon feeding may be disconnected. Therefore, the ribbon may not be fed during the sheet feeding operation or sheet discharge operation, so that the ribbon may not be wasted.

In a communication apparatus of the invention, the regulating unit may include an elastic protrusion that is provided on the rotating member and engages in a positioning opening formed in a base member at positions on the path of the planetary gear that pivotally rotates. Therefore, each planetary gear may be positioned by the elastic protrusion at each of the positions on the path of the planetary gear where the planetary gear pivotally rotates. While each planetary gear and one of the driven gears are securely engaged with each other, the driven gears may be properly rotated through each planetary gear.

A communication apparatus of the invention may include a document feeding operation for feeding a document to be read, a sheet feeding operation for feeding a recording sheet, a recording operation for performing recording with a recording head onto the recording sheet, and a sheet discharging operation for discharging the recording sheet, as executable operations. These operations may be associated with any of the driven gears. At least one driven gears to be used in the transmission mode, the reception mode, and the copying mode, may be predetermined.

When the sun gear is rotated in one direction, at least one position associated with the at least one driven gear required for the operation in the respective mode, may be selected, and the at least one driven gear may be engaged with the planetary gear. When the sun gear is rotated in an opposite direction, the planetary gear may be rotated on the axis thereof while engaging with the driven gear. By selecting the rotating directions of the sun gear based on the rotation of the drive motor in the forward direction or the reverse direction, the operations required for each mode may be selectively performed. Accordingly, when the operations are executed in the transmission mode, the reception mode, and the copying mode, the driven gear required for operations in the respective mode may be selected by rotating the sun gear in one direction and the selected driven gear may be engaged with the planetary gear.

When the sun gear is rotated in an opposite direction, the planetary gear may be rotated on the axis thereof while engaging with the selected driven gear. The operations required for the transmission mode, the reception mode, and the copying mode may be selectively performed by selecting the rotating directions of the sun gear, based on the rotation of the drive motor in the forward direction or the reverse direction. Accordingly, the number of components to be used for a drive force transmission mechanism may be reduced, thereby simplifying the mechanism. Consequently, the communication apparatus including the drive force transmission mechanism with its cost reduced may be achieved.

While this invention has been described in conjunction with specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A gear changing device, comprising:
   a drive motor rotatable in a forward direction or a reverse direction;
   a sun gear that is rotated by the drive motor;
   a planetary gear that is constantly engaged with the sun gear;
   a rotating member that is concentric with the sun gear and rotates in a same direction as the sun gear when the sun gear rotates in the forward direction, so as to pivotally rotate the planetary gear around the sun gear, and that stops rotating when the sun gear rotates in the reverse direction, so as to allow the planetary gear to rotate on an axis of the planetary gear to a plurality of predetermined positions on a path of the planetary gear where the planetary gear pivotally rotates, the rotating member being provided on a circumference thereof with a plurality of recesses and projections that are one of indented and protruded in a diametrical direction of the rotating member, the rotating member alternately disposing the recesses and projections, each having a specific width;
   a plurality of transmission gears that are engaged with the planetary gear at the predetermined positions on the path of the planetary gear where the planetary gear pivotally rotates; and electronic sensors switch that detects the recesses and the projections at a fixed position.

2. The gear changing device according to claim 1, further comprising a controller that detects, based on a signal from the sensor switch, at least one of a time at which a projection detection condition where one of the projections is detected is changed to a recess detection condition when one of the recesses is detected, and a time at which the recess detection condition is changed to the projection detection while the sun gear is rotated in the forward direction by controlling the drive motor, the controller recognizing at the time, an operation mode in which the planetary gear and any of the transmission gears can be engaged with each other.

3. The gear changing device according to claim 2, wherein after recognizing the operation mode, the controller detects, based on the signal from the sensor switch, at least one of a time at which the projection detection condition is again brought about after the recess detection condition, and a time at which the recess detection condition is again brought about after the projection detection condition, and starts to rotate the sun gear in the reverse direction based on the detected time.

4. The gear changing device according to claim 3, wherein if the recess detection condition is not changed to the projection detection condition or the projection detection condition is not changed to the recess detection condition after a predetermined time has passed since the sun gear starts to rotate in the reverse direction, the controller rotates the sun gear in the forward direction to rotate the rotating member once and thereafter starts to rotate the sun gear in the reverse direction to make a retry.

5. The gear changing device according to claim 1, wherein the gear changing device is for use in an apparatus that requires switching of a plurality of different operation modes according to engagement combinations of the planetary gear with the transmission gears.

6. The gear changing device according to claim 1, wherein the electronic sensor switch sends an ON level signal or an OFF level signal.

7. A communication apparatus that performs communication with a remote communication apparatus, comprising:
a gear changing device, including;
a drive motor rotatable in a forward direction or a reverse direction;
a sun gear that is rotated by the drive motor;
a planetary gear that is constantly engaged with the sun gear;
a rotating member that is concentric with the sun gear and rotates ma same direction as the sun gear when the sun gear rotates in the forward direction, so as to pivotally rotate the planetary gear around the sun gear, and that stops rotating when the sun gear rotates in the reverse direction, so as to allow the planetary gear to rotate on an axis of the planetary gear to a plurality of predetermined positions on a path of the planetary gear where the planetary gear pivotally rotates, the rotating member being provided on a circumference thereof with a plurality of recesses and projections that are one of indented and protruded in a diametrical direction of the rotating member, the rotating member alternately disposing the recesses and projections, each having a specific width;
a plurality of transmission gears that are engaged with the planetary gear at the predetermined positions on the path of the planetary gear where the planetary gear pivotally rotates; and electronic sensor switch that detects the recesses and the projections at a fixed position; and wherein the communication apparatus includes at least a transmission mode and a reception mode in association with the transmission gears.

8. The communication apparatus according to claim 7, further comprising a controller that detects, based on a signal from the sensor switch, at least one of a time of a projection detection condition where one of the projections detected is changed to a recess detection condition when one of the recesses is detected, and a time at which the recess detection condition is changed to the projection detection while the sun gear is rotated in the forward direction by controlling the drive motor, the controller recognizing at the time, an operation mode in which the planetary gear and any of the transmission gears can be engaged with each other.

9. The communication apparatus according to claim 8, wherein after recognizing the operation mode, the controller detects, based on the signal from the sensor switch, at least one of a time at which the projection detection condition is again brought about after the recess detection condition and a time at which the recess detection condition is again brought about after the projection detection condition, and starts to rotate the sun gear in the reverse direction based on the time.

10. The communication apparatus according to claim 9, wherein if at least one of the recess detection condition is not changed to the projection detection condition and the projection detection condition is not changed to the recess detection condition after a predetermined time has passed since the sun gear starts to rotate in the reverse direction, the controller rotates the sun gear in the forward direction to rotate the rotating member once and thereafter starts to rotate the sun gear in the reverse direction to make a retry.

11. The communication apparatus according to claim 7, wherein the electronic sensor switch sends an ON level signal or an OFF level signal.

12. A communication apparatus that performs communication with a remote communication apparatus and includes modes of at least a transmission mode, a reception mode, and a copying mode, comprising:
a drive motor rotatable in a forward direction or a reverse direction;
a sun gear that is rotated by the drive motor;
a planetary gear that is constantly engaged with the sun gear;
a regulating unit that allows the planetary gear to pivotally rotate around the sun gear when the sun gear is rotated in one direction based on a rotation of the drive motor, and that prevents the planetary gear from pivotally rotating but allows the planetary gear to rotate on an axis of the planetary gear to a plurality of positions on a path of the planetary where the planetary gear pivotally rotates, when the sun gear is rotated in an opposite direction; and
a drive force transmission mechanism including a plurality of driven gears that engage with the planetary gear rotating on the axis thereof at the plurality of positions on the path of the planetary gear where the planetary gear pivotally rotates; and
wherein the communication apparatus selects a predetermined number of at least one position from the plurality of the positions on the path of the planetary gear with the regulating unit in association with each of the modes, and selectively rotates the driven gears by rotating the planetary gear on the axis thereof at the at least one position that is selected.

13. The communication apparatus according to claim 12, further comprising a rotating member that is concentric with the sun gear and rotatable, the rotating member including a pair of arms forming a predetermined angle and rotatably supporting the planetary gear at each of the arms, and
wherein the regulating unit has a frictional load generating device that is disposed between the sun gear and the rotating member and that switches a frictional load generated therebetween according to rotating directions of the sun gear, and a rotation regulating member that regulates a rotation of the rotating member.

14. The communication apparatus according to claim 13, wherein the predetermined angle formed by the arms of the rotating member is set to such an angle that two positions on the path of the planetary gear where the planetary gear pivotally rotates are selectable.

15. The communication apparatus according to claim 14, wherein the planetary gear rotatably supported by each of the arms selectively engages with one of the driven gears in the copying mode.

16. The communication apparatus according to claim 13, further comprising a base member that rotatably supports each of the driven gears and has a positioning opening formed thereon so as to correspond to each of the plurality of positions on the path of the planetary gear where the planetary gear pivotally rotates, and
wherein the regulating unit includes an elastic protrusion that is provided on the rotating member and engages in the positioning opening at each of the positions on the path of the planetary gear.

17. The communication apparatus according to claim 12, wherein a sheet feeding operation for feeding a recording sheet, a recording operation for performing recording onto the recording sheet with a recording head, and a sheet discharging operation for discharging the recording sheet are performed in the reception mode and the copying mode, and a driven gear among the plurality of the driven gears that is required for the sheet feeding operation, the recording operation, and the sheet discharging operation is consecutively disposed on the path of the planetary gear.

18. The communication apparatus according to claim 17, wherein the recording head is a thermal head that performs recording onto the recording sheet through a ribbon, and
wherein the communication apparatus further includes a gear for feeding the ribbon and when the driven gear required for the sheet feeding operation or the sheet discharging operation is selected from the plurality of the driven gears, the driven gear that is selected is disconnected to the gear for feeding the ribbon.

19. A communication apparatus that performs communication with a remote communication apparatus, the communication apparatus having modes of at least a transmission mode, a reception mode, and a copying mode, and including executable operations of a document feeding operation for feeding a document to be read, a sheet feeding operation for feeding a recording sheet, a recording operation for performing recording onto the recording sheet with a recording device, and a sheet discharging operation for discharging the recording sheet, the communication apparatus, comprising:
a drive force transmission mechanism, including:
a drive motor rotatable in a forward direction or a reverse direction;
a sun gear that is rotated by the drive motor;
a planetary gear that is constantly engaged with the sun gear;
a regulating unit that allows the planetary gear to pivotally rotate around the sun gear when the sun gear is rotated in one direction based on a rotation of the drive motor, and that prevents the planetary gear from pivotally rotating but allows the planetary gear to rotate on an axis of the planetary gear to a plurality of positions on a path of the planetary where the planetary gear pivotally rotates, when the sun gear is rotated in an opposite direction; and
a plurality of driven gears that engage with the planetary gear rotating on the axis thereof at the plurality of positions on the path of the planetary gear where the planetary gear pivotally rotates; and
wherein the communication apparatus associates the driven gears with any of the executable operations, at least one of the driven gears to be used in each of the modes is predetermined, at least one position on the path of the planetary gear that is associated with the at least one of the driven gears, is selected with the regulating unit according to the modes to be executed as the sun gear is rotated in one direction, and the at least one of the driven gears associated with the at least one position that is selected, is driven by rotating the planetary gear on the axis thereof as the sun gear is rotated in an opposite direction, to selectively execute the modes.

* * * * *